US010868697B2

(12) United States Patent
Gao et al.

(10) Patent No.: US 10,868,697 B2
(45) Date of Patent: Dec. 15, 2020

(54) PACKET PROCESSING METHOD, DEVICE, AND PACKET PROCESSING SYSTEM

(71) Applicant: HUAWEI TECHNOLOGIES CO., LTD., Shenzhen (CN)

(72) Inventors: Yuan Gao, Nanjing (CN); Xingguo Sun, Nanjing (CN); Yongli Yuan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 16/125,775

(22) Filed: Sep. 10, 2018

(65) Prior Publication Data
US 2019/0036736 A1    Jan. 31, 2019

Related U.S. Application Data

(63) Continuation of application No. PCT/CN2017/075618, filed on Mar. 3, 2017.

(30) Foreign Application Priority Data

Aug. 29, 2016  (CN) .......................... 2016 1 0754606

(51) Int. Cl.
*H04L 12/46* (2006.01)
*H04L 29/12* (2006.01)
*H04L 29/06* (2006.01)

(52) U.S. Cl.
CPC ...... *H04L 12/4641* (2013.01); *H04L 12/4633* (2013.01); *H04L 61/6022* (2013.01);
(Continued)

(58) Field of Classification Search
CPC ............. H04L 12/4641; H04L 12/4633; H04L 12/4683; H04L 69/22; H04L 63/0876; H04L 63/029; H04L 63/08; H04L 61/6022
See application file for complete search history.

(56) References Cited

U.S. PATENT DOCUMENTS

2002/0089958 A1  7/2002  Feder et al.
2004/0013130 A1*  1/2004  Blanchet ................ H04L 69/16
                                                                370/466
(Continued)

FOREIGN PATENT DOCUMENTS

CN    101720547 A    5/2010
CN    101888703 A    11/2010
(Continued)

OTHER PUBLICATIONS

W. Simpson, Editor, Daydreamer, Tile Point-to-Point Protocol (PPP) rfc1661, Jul. 1994, 54 pages.
(Continued)

*Primary Examiner* — Min Jung
(74) *Attorney, Agent, or Firm* — Kilpatrick Townsend & Stockton LLP

(57) ABSTRACT

A packet processing method, a device, and a packet processing system are provided. The method includes: generating, by a VTEP device at one end of a VXLAN tunnel, a PPP over VXLAN packet that carries control information, and transmitting the PPP over VXLAN packet to a VTEP device at the other end of the VXLAN tunnel by using the VXLAN tunnel. The VTEP device at the other end of the VXLAN tunnel may perform, based on the control information in the PPP over VXLAN packet, a function defined in PPP. In this way, a VXLAN control plane is implemented by using the PPP, and overheads and complexity of implementing the VXLAN control plane are reduced.

27 Claims, 19 Drawing Sheets

(52) U.S. Cl.
CPC ........ *H04L 63/029* (2013.01); *H04L 63/0876* (2013.01); *H04L 69/22* (2013.01); *H04L 63/08* (2013.01)

(56) References Cited

U.S. PATENT DOCUMENTS

| | | |
|---|---|---|
| 2008/0305772 A1 | 12/2008 | Balasubramanian et al. |
| 2012/0044920 A1 | 2/2012 | Wang et al. |
| 2014/0123211 A1 | 5/2014 | Wanser et al. |
| 2015/0082418 A1 | 3/2015 | Gu et al. |
| 2016/0072669 A1* | 3/2016 | Saavedra ............ H04L 12/2867 709/220 |
| 2016/0198501 A1* | 7/2016 | Verkaik ................ H04W 8/04 370/329 |
| 2016/0218975 A1 | 7/2016 | Hyoudou et al. |
| 2018/0145868 A1* | 5/2018 | Xu ....................... H04W 88/16 |
| 2019/0013968 A1* | 1/2019 | Xie ..................... H04L 12/4641 |

FOREIGN PATENT DOCUMENTS

| | | |
|---|---|---|
| CN | 103379010 A | 10/2013 |
| CN | 104378457 A | 2/2015 |
| CN | 104954333 A | 9/2015 |
| CN | 105049241 A | 11/2015 |
| CN | 105763416 A | 7/2016 |
| JP | 2016134876 A | 7/2016 |

OTHER PUBLICATIONS

M. Mahalingam et al, Virtual eXtensibie Local Area Network (VXLAN): A Framework for Overlaying Virtualized Layer 2 Networks over Layer 3 Networks, rfc7348, Aug. 2014, 22 pages.

A. Sajassi, Ed. Et al, BGP MPLS-Based Ethernet VPN, Rfc7432, Feb. 2015, 56 pages.

* cited by examiner

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| R | R | R | R | I | P | R | R | Reserved (Reserved) | | | | | | | | | | | | | | | | Protocol (Protocol) | | | | | | | |
| VNI | | | | | | | | | | | | | | | | | | | | | | | | Reserved (Reserved) | | | | | | | |

FIG. 12

PACKET PROCESSING METHOD, DEVICE, AND PACKET PROCESSING SYSTEM

CROSS-REFERENCE TO RELATED APPLICATIONS

This application is a continuation of International Application No. PCT/CN2017/075618, filed on Mar. 3, 2017, which claims priority to Chinese Patent Application No. 201610754606.3, filed on Aug. 29, 2016. The disclosures of the aforementioned applications are hereby incorporated by reference in their entireties.

TECHNICAL FIELD

This application relates to the field of communications technologies, and in particular, to a packet processing method, a device, and a packet processing system. More specifically, this application relates to a virtual extensible local area network (VXLAN) technology.

BACKGROUND

A VXLAN is a technology for encapsulating a layer 2 packet by using a layer 3 protocol. The VXLAN technology relates to a packet in a MAC-in-UDP format. Specifically, an Ethernet frame that is based on the Media Access Control (MAC) protocol is encapsulated into a User Datagram Protocol (UDP) packet. Further, the UDP packet is encapsulated into an Internet Protocol (IP) packet. The IP packet may be transmitted in a layer 3 network. Therefore, the Ethernet frame is transmitted in the layer 3 network. In the VXLAN technology, a VXLAN network identifier (VNI) is used to identify a VXLAN network segment. Different VXLAN network segments are corresponding to different VNIs. Different VXLAN network segments are isolated. Two virtual machines (VM) in a same VNI can directly communicate. To be specific, the two VMs in the same VNI can communicate without using a VXLAN layer 3 gateway (VXLAN L3 Gateway). Two VMs in different VNIs need to communicate by using a VXLAN layer 3 gateway. A VNI field includes 24 bits. A management domain may include a maximum of $2^{16}$ VXLAN network segments.

A VXLAN tunnel end point (VTEP) device is an edge device in a VXLAN. The VTEP device transmits VXLAN traffic by using a VXLAN tunnel. The VXLAN tunnel is a point-to-point logical tunnel between two VTEP devices.

In an actual application scenario, a VXLAN data plane solution is mainly defined in the VXLAN technology, while a VXLAN control plane solution is not defined in the VXLAN technology. Therefore, a Border Gateway Protocol Ethernet virtual private network (BGP EVPN) may be used to implement a VXLAN control plane. However, overheads of implementing the VXLAN control plane by using the BGP are relatively high, and deployment is complex.

SUMMARY

In view of this, embodiments of the present invention provide a packet processing method, a device, and a packet processing system, to help reduce overheads and complexity of implementing a VXLAN control plane.

Technical solutions provided in the embodiments of the present invention are as follows:

According to a first aspect, a packet processing method is provided, where the method includes: obtaining, by a first VTEP device, control information (for example, the control information may include authentication request information, an echo packet, a MAC address or routing information of a VTEP device, or the like), where the control information is for implementing a function defined in the Point-to-Point Protocol (PPP); then generating, by the first VTEP device, a first VXLAN packet based on the control information, where the first VXLAN packet includes a first VXLAN header and a first VXLAN payload, the first VXLAN payload includes a first PPP packet, the first PPP packet includes a first PPP header and a first PPP payload, and the first PPP payload includes the control information; and sending, by the first VTEP device, the first VXLAN packet to a second VTEP device by using a first VXLAN tunnel.

Based on the solution provided in this embodiment, the PPP is introduced into a VXLAN control plane. The VXLAN control plane may be implemented by using the PPP, to ensure that simple VXLAN control plane communication is implemented during use of the VXLAN control plane. Compared with a technical solution of implementing a VXLAN control plane by using BGP, the technical solution of implementing the VXLAN control plane by using the PPP helps reduce overheads and complexity of implementing the VXLAN control plane.

In a possible implementation of the first aspect, the control information includes authentication request information, the authentication request information is for implementing an authentication function defined in the PPP, and after the sending, by the first VTEP device, the first VXLAN packet to a second VTEP device by using a first VXLAN tunnel, the method further includes: receiving, by the first VTEP device, a second VXLAN packet from the second VTEP device by using the first VXLAN tunnel, where the second VXLAN packet includes a second VXLAN header and a second VXLAN payload, the second VXLAN payload includes a second PPP packet, the second PPP packet includes a second PPP header and a second PPP payload, and the second PPP payload includes authentication response information of the authentication request information; and determining, by the first VTEP device based on the authentication response information in the second VXLAN packet, that the first VTEP device has been authenticated by the second VTEP device according to the PPP or fails to be authenticated by the second VTEP device according to the PPP.

Further, in some embodiments, the obtaining, by a first VTEP device, control information includes: receiving, by the first VTEP device, verification information from the second VTEP device, where the verification information includes a packet randomly generated by the second VTEP device, the randomly generated packet is data randomly generated by the second VTEP device, and in some embodiments, a maximum length of the randomly generated packet is 16 bytes; and then obtaining, by the first VTEP device, the authentication request information, where the authentication request information includes the packet randomly generated by the second VTEP device.

In the foregoing implementation, authentication may be implemented on the VTEP device. Therefore, the PPP is introduced into the VXLAN control plane, to ensure that a VTEP device authentication mechanism is established during use of the VXLAN control plane, and to determine validity of the VXLAN tunnel.

In another possible implementation of the first aspect, the control information includes a first echo packet, the first echo packet is for implementing a connectivity detection function defined in the PPP, and after the sending, by the first VTEP device, the first VXLAN packet to a second VTEP device by using a first VXLAN tunnel, the method further includes: receiving, by the first VTEP device, a second VXLAN packet from the second VTEP device by using the first VXLAN tunnel, where the second VXLAN packet includes a second VXLAN header and a second VXLAN payload, the second VXLAN payload includes a second PPP packet, the second PPP packet includes a second PPP header and a second PPP payload, and the second PPP payload includes a reply packet of the first echo packet; and then determining, by the first VTEP device based on the second VXLAN packet, that the first VXLAN tunnel is connected.

Further, in some embodiments, the first VTEP device periodically sends, to the second VTEP device at an interval of predetermined duration, the first VXLAN packet that carries the first echo packet.

In the foregoing implementation, a VXLAN tunnel connectivity and keepalive detection mechanism may be implemented.

In still another possible implementation of the first aspect, the control information includes a MAC address of the first VTEP device, the MAC address of the first VTEP device is carried in a configuration option of the first PPP payload, the first PPP packet is a first configure-request packet, and after the sending, by the first VTEP device, the first VXLAN packet to a second VTEP device by using a first VXLAN tunnel, the method further includes: receiving, by the first VTEP device, a second VXLAN packet from the second VTEP device by using the first VXLAN tunnel, where the second VXLAN packet includes a second VXLAN header and a second VXLAN payload, the second VXLAN payload includes a second PPP packet, the second PPP packet includes a second PPP header and a second PPP payload, the second PPP payload includes a MAC address of the second VTEP device, the second PPP packet is a second configure-request packet, and the MAC address of the second VTEP device is carried in a configuration option of the second PPP payload.

In the foregoing implementation, the MAC addresses of the VTEP devices at both ends of the VXLAN tunnel may be negotiated based on the VXLAN packet, so that the following problem is resolved: Route synchronization learning that is based on the BGP EVPN protocol requires that each piece of routing information transmitted by the VTEP devices at both ends carries MAC address information of the VTEP devices, and consequently more network resources are occupied.

Further, in some embodiments, after the receiving, by the first VTEP device, a second VXLAN packet from the second VTEP device by using the first VXLAN tunnel, the method further includes: generating, by the first VTEP device, a third VXLAN packet, where the third VXLAN packet includes a third VXLAN header and a third VXLAN payload, the third VXLAN payload includes a third PPP packet, the third PPP packet includes a third PPP header and a third PPP payload, the third PPP payload includes a routing protocol packet, the routing protocol packet carries a route that is from the first VTEP device to a VM connected to the first VTEP device, and the routing protocol packet is a Routing Information Protocol (RIP) packet or an Open Shortest Path First (OSPF) packet; and then sending, by the first VTEP device, the third VXLAN packet to the second VTEP device by using the first VXLAN tunnel.

In the foregoing implementation, a dynamic route synchronization learning mechanism may be implemented in a manner in which the VXLAN packet carries the routing protocol packet, so that complexity of dynamic route synchronization learning is reduced.

In still another possible implementation of the first aspect, the control information includes a first echo packet, the first echo packet is for implementing a loop detection function defined in the PPP, the first echo packet carries a first magic number, and the method further includes: receiving, by the first VTEP device, a second VXLAN packet from a third VTEP device by using a second VXLAN tunnel, where the second VXLAN packet includes a second VXLAN header and a second VXLAN payload, the second VXLAN payload includes a second PPP packet, the second PPP packet includes a second PPP header and a second PPP payload, the second PPP payload includes a second echo packet, and the second echo packet carries a second magic number; and when a value of the first magic number is equal to a value of the second magic number, determining, by the first VTEP device, that the first VXLAN tunnel, the second VXLAN tunnel, and a third VXLAN tunnel form a loop, where a VXLAN tunnel between the second VTEP device and the third VTEP device is the third VXLAN tunnel.

In the foregoing implementation, loop detection in a VXLAN network may be implemented based on the VXLAN packet, to help a network administrator discover in time a loop existing in the VXLAN network.

According to a second aspect, a packet processing method is provided, where the method includes: receiving, by a second VTEP device, a first VXLAN packet from a first VTEP device by using a first VXLAN tunnel, where the first VXLAN packet includes a first VXLAN header and a first VXLAN payload, the first VXLAN payload includes a first PPP packet, the first PPP packet includes a first PPP header and a first PPP payload, the first PPP payload includes control information, and the control information is for implementing a function defined in PPP; and then decapsulating, by the second VTEP device, the first VXLAN packet to obtain the control information.

Based on the solution provided in this embodiment, the PPP is introduced into a VXLAN control plane. The VXLAN control plane may be implemented by using the PPP, to ensure that simple VXLAN control plane communication is implemented during use of the VXLAN control plane. Compared with a technical solution of implementing a VXLAN control plane by using BGP, the technical solution of implementing the VXLAN control plane by using the PPP helps reduce overheads and complexity of implementing the VXLAN control plane. The implementing a VXLAN control plane by using BGP is specifically implementing the VXLAN control plane by using a BGP EVPN.

In a possible implementation of the second aspect, the control information includes authentication request information, the authentication request information is for implementing an authentication function defined in the PPP, and after the decapsulating, by the second VTEP device, the first VXLAN packet to obtain the control information, the method further includes: determining, by the second VTEP device, authentication response information of the authentication request information based on the authentication request information; then generating, by the second VTEP device, a second VXLAN packet based on the authentication response information, where the second VXLAN packet includes a second VXLAN header and a second VXLAN payload, the second VXLAN payload includes a second PPP packet, the second PPP packet includes a second PPP header and a second PPP payload, and the second PPP payload includes the authentication response information of the authentication request information; sending, by the second VTEP device, the second VXLAN packet to the first VTEP device by using the first VXLAN tunnel; and further determining, by the second VTEP device based on the authentication response information, that the first VTEP device has been authenticated by the second VTEP device according to the PPP or fails to be authenticated by the second VTEP device according to the PPP.

Further, in some embodiments, before the receiving, by a second VTEP device, a first VXLAN packet from a first VTEP device by using a first VXLAN tunnel, the method further includes: generating, by the second VTEP device, verification information, where the verification information includes a random packet; and sending, by the second VTEP device, the verification information to the first VTEP device, where the verification information is used by the first VTEP device to obtain the authentication request information based on the verification information.

Further, in some embodiments, the determining, by the second VTEP device based on the authentication response information, that the first VTEP device has been authenticated by the second VTEP device according to the PPP or fails to be authenticated by the second VTEP device according to the PPP includes: when the second VTEP device determines, based on the authentication response information, that the first VTEP device has been authenticated by the second VTEP device according to the PPP, determining, by the second VTEP device, that a status of the first VXLAN tunnel is up; or when the second VTEP device determines, based on the authentication response information, that the first VTEP device fails to be authenticated by the second VTEP device according to the PPP, determining, by the second VTEP device, that a status of the first VXLAN tunnel is down.

In the foregoing implementation, authentication may be implemented on the VTEP device. Therefore, the PPP is introduced into the VXLAN control plane, to ensure that a VTEP device authentication mechanism is established during use of the VXLAN control plane, and to determine validity of the VXLAN tunnel.

In still another possible implementation of the second aspect, the control information includes a first echo packet, the first echo packet is for implementing a connectivity detection function defined in the PPP, and after the decapsulating, by the second VTEP device, the first VXLAN packet to obtain the control information, the method further includes: determining, by the second VTEP device, a reply packet of the first echo packet based on the first echo packet; then generating, by the second VTEP device, a second VXLAN packet based on the reply packet, where the second VXLAN packet includes a second VXLAN header and a second VXLAN payload, the second VXLAN payload includes a second PPP packet, the second PPP packet includes a second PPP header and a second PPP payload, and the second PPP payload includes the reply packet of the first echo packet; and sending, by the second VTEP device, the second VXLAN packet to the first VTEP device by using the first VXLAN tunnel.

In the foregoing implementation, a VXLAN tunnel connectivity and keepalive detection mechanism may be implemented.

In still another possible implementation of the second aspect, the control information includes a MAC address of the first VTEP device, the MAC address of the first VTEP device is carried in a configuration option of the first PPP payload, the first PPP packet is a first configure-request packet, and after the decapsulating, by the second VTEP device, the first VXLAN packet to obtain the control information, the method further includes: generating, by the second VTEP device, a second VXLAN packet based on a MAC address of the second VTEP device, where the second VXLAN packet includes a second VXLAN header and a second VXLAN payload, the second VXLAN payload includes a second PPP packet, the second PPP packet includes a second PPP header and a second PPP payload, the second PPP payload includes the MAC address of the second VTEP device, the second PPP packet is a second configure-request packet, and the MAC address of the second VTEP device is carried in a configuration option of the second PPP payload; and sending, by the second VTEP device, the second VXLAN packet to the first VTEP device by using the first VXLAN tunnel.

In the foregoing implementation, the MAC addresses of the VTEP devices at both ends of the VXLAN tunnel may be negotiated based on the VXLAN packet, so that the following problem is resolved: Route synchronization learning that is based on the BGP EVPN protocol requires that each piece of routing information transmitted by the VTEP devices at both ends carries MAC address information of the VTEP devices, and consequently more network resources are occupied.

Further, in some embodiments, after the sending, by the second VTEP device, the second VXLAN packet to the first VTEP device by using the first VXLAN tunnel, the method further includes: receiving, by the second VTEP device, a third VXLAN packet from the first VTEP device by using the first VXLAN tunnel, where the third VXLAN packet includes a third VXLAN header and a third VXLAN payload, the third VXLAN payload includes a third PPP packet, the third PPP packet includes a third PPP header and a third PPP payload, the third PPP payload includes a routing protocol packet, the routing protocol packet carries a route that is from the first VTEP device to a VM connected to the first VTEP device, and the routing protocol packet is a RIP packet or an OSPF packet; and updating, by the second VTEP device, a routing table of the second VTEP device based on the MAC address of the first VTEP device and the route that is from the first VTEP device to the VM connected to the first VTEP device and that is carried in the routing protocol packet.

In the foregoing implementation, a dynamic route synchronization learning mechanism may be implemented in a manner in which the VXLAN packet carries the routing protocol packet, so that complexity of dynamic route synchronization learning is reduced.

According to a third aspect, a first VTEP device is provided, where the first VTEP device has a function of implementing a behavior of the first VTEP device in the foregoing method. The function may be implemented based on hardware or may be implemented by executing corresponding software based on hardware. The hardware or the software includes one or more modules corresponding to the function.

In a possible design, a structure of the first VTEP device includes a processor and an interface, where the processor is configured to support the first VTEP device in executing corresponding functions in the foregoing methods; and the interface is configured to: support communication between the first VTEP device and a second VTEP device; and send, to the second VTEP device, information or an instruction in the foregoing method; or receive, from the second VTEP device, information or an instruction in the foregoing method. The first VTEP device may further include a memory, where the memory is configured to be coupled to the processor and store a program instruction and data that are necessary for the first VTEP device.

According to a fourth aspect, a second VTEP device is provided, where the second VTEP device has a function of implementing a behavior of the second VTEP device in the foregoing method. The function may be implemented based on hardware or may be implemented by executing corresponding software based on hardware. The hardware or the software includes one or more modules corresponding to the function.

In a possible design, a structure of the second VTEP device includes a processor and an interface, where the processor is configured to support the second VTEP device in executing corresponding functions in the foregoing methods; and the interface is configured to: support communication between the second VTEP device and a first VTEP device; and send, to the first VTEP device, information or an instruction in the foregoing method; or receive, from the first VTEP device, information or an instruction in the foregoing method. The second VTEP device may further include a memory, where the memory is configured to be coupled to the processor and store a program instruction and data that are necessary for the second VTEP device.

In the first aspect, the second aspect, the third aspect, and the fourth aspect, in some embodiments, the first VXLAN header includes first identification information, and the first identification information is used to identify that the first VXLAN payload includes the first PPP packet.

According to a fifth aspect, a packet processing system is provided, where the system includes the first VTEP device according to the third aspect and the second VTEP device according to the fourth aspect, and the first VTEP device can bidirectionally communicate with the second VTEP device by using a first VXLAN tunnel.

According to a sixth aspect, a computer storage medium is provided and is configured to store a program, code, or an instruction used by the first VTEP device, and when a processor or a hardware device executes the program, the code, or the instruction, a function or a step of the first VTEP device according to the foregoing aspects may be completed.

According to a seventh aspect, a computer storage medium is provided and is configured to store a program, code, or an instruction used by the second VTEP device, and when a processor or a hardware device executes the program, the code, or the instruction, a function or a step of the second VTEP device according to the foregoing aspects may be completed.

By using the foregoing solutions, according to the packet processing method, the device, and the packet processing system that are provided in the embodiments of the present application, a VTEP device at one end of a VXLAN tunnel generates a PPP over VXLAN packet that carries control information, and transmits the PPP over VXLAN packet to a VTEP device at the other end of the VXLAN tunnel by using the VXLAN tunnel; and the VTEP device at the other end of the VXLAN tunnel may execute, based on the control information in the PPP over VXLAN packet, a function defined in PPP. Therefore, the VXLAN control plane is implemented by using the PPP, to ensure that the simple VXLAN control plane communication is implemented during use of the VXLAN control plane, and to help reduce overheads and complexity of implementing the VXLAN control plane.

BRIEF DESCRIPTION OF DRAWINGS

FIG. 12 is a diagram of an encapsulation format of a VXLAN header according to an embodiment of the present invention;

DESCRIPTION OF EMBODIMENTS

The embodiments of the present invention provide a packet processing method, a device, and a packet processing system, to help reduce overheads and complexity of implementing a VXLAN control plane.

The following separately provides detailed descriptions by using specific embodiments.

To make the inventive objectives, features, and advantages of this application clearer and more comprehensible, the following describes the technical solutions in the embodiments of the present invention with reference to the accompanying drawings in the embodiments of the present invention. Apparently, embodiments described below are merely some but not all of the embodiments of the present invention. A person of ordinary skill in the art can obtain other embodiments based on the embodiments of the present invention.

In the specification, claims, and accompanying drawings of this application, the terms "first", "second", "third", "fourth", and the like are intended to distinguish between different objects but do not indicate a particular order. In addition, the terms "include" and "have" are not exclusive. For example, a process, a method, a system, a product, or a device including a series of steps or units is not limited to the listed steps or units, and may further include steps or units that are not listed.

In the embodiments of the present invention, a transmit-end VTEP device is a VTEP device that performs VXLAN encapsulation and that sends a VXLAN packet, and a receive-end VTEP device is a VTEP device that receives a VXLAN packet and that performs VXLAN decapsulation.

Figure 1:
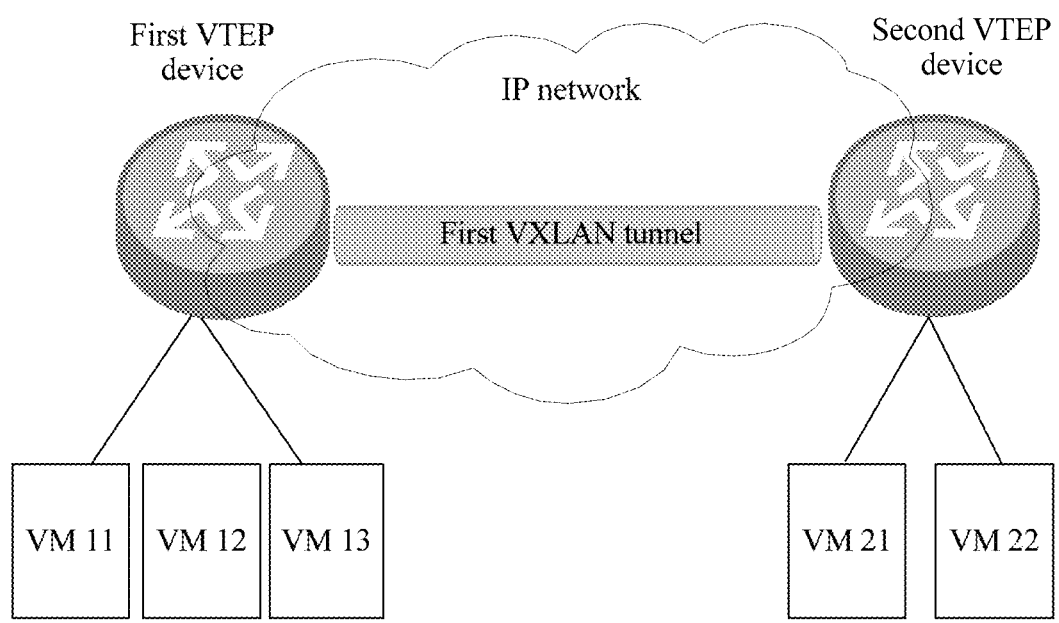
FIG. 1 is a schematic structural diagram of a VXLAN network according to an embodiment of the present invention.

FIG. 1 is a schematic structural diagram of a VXLAN network according to an embodiment of the present invention. As shown in FIG. 1, the VXLAN network includes a first VTEP device and a second VTEP device. The first VTEP device may bidirectionally communicate with the second VTEP device by using a first VXLAN tunnel. The first VTEP device on an edge of an IP network bidirectionally communicates with the second VTEP device on an edge of the IP network based on the first VXLAN tunnel. The first VTEP device may be connected to at least one VM. As shown in FIG. 1, the first VTEP device is connected to a VM 11, a VM 12, and a VM 13. For example, the VM 11, the VM 12, and the VM 13 are separately connected to the first VTEP device by using solid connection lines shown in FIG. 1. The second VTEP device may be connected to at least one VM. As shown in FIG. 1, the second VTEP device is connected to a VM 21 and a VM 22. For example, the VM 21 and the VM 22 are separately connected to the second VTEP device by using solid connection lines shown in FIG. 1. Based on such settings, any one of the VM 11, the VM 12, and the VM 13 can bidirectionally communicate with either of the VM 21 and the VM 22 by using the first VTEP device, the second VTEP device, and the first VXLAN tunnel.

A typical VXLAN network model includes the following parts.

A VTEP device is a VXLAN edge device and is configured to complete VXLAN-related processing. For example, the VTEP device may identify a VXLAN to which an Ethernet frame belongs, perform layer 2 forwarding on the Ethernet frame based on the VXLAN, encapsulate/decapsulate a packet, manage a VXLAN tunnel, and so on. In a possible implementation, the VTEP device may be an individual physical device that includes no VM. As shown in FIG. 1, the first VTEP device and the second VTEP device include no VM, and each of the first VTEP device and the second VTEP device is implemented by an individual physical device. In another possible implementation, a function of the VTEP device is implemented by a server in which a VM is located. For example, a server in which the VM 11 is located is a server 1, and a server in which the VM 21 is located is a server 2. The server 1 may be used as the first VTEP device, and the server 2 may be used as the second VTEP device. In a VXLAN application scenario, the VTEP device may also be referred to as a network virtualization edge (NVE) device. In some application scenarios, the VTEP device is understood as a module integrated into an NVE device. In this application, the VTEP device is equivalent to the NVE device unless otherwise specified.

A VM is connected to the VTEP device and belongs to a downstream device of the VTEP device. The VM may run in a server. A server may include at least one VM. As shown in FIG. 1, the first VTEP device is connected to the VM 11, the VM 12, and the VM 13, and the VM 11, the VM 12, and the VM 13 are located in three servers, respectively. In a possible implementation, a server may include a plurality of VMs. For example, a server in which the VM 11 is located is a server 1, and the server 1 not only includes the VM 11, but also includes a VM 14 (not shown in FIG. 1). Different VMs may belong to different VXLAN network segments.

A VXLAN tunnel is for implementing traffic transmission between two VTEP devices. As shown in FIG. 1, the first VTEP device performs VXLAN encapsulation on an Ethernet frame from the VM 11 to generate a VXLAN packet. The first VTEP device sends the VXLAN packet to the second VTEP device by using the first VXLAN tunnel. The second VTEP device decapsulates the VXLAN packet to obtain the Ethernet frame, and sends the Ethernet frame to the VM 21.

A virtual switching instance (VSI) provides a virtual switching instance of a layer 2 switching service for a VXLAN network segment in the VTEP device. The VSI may be considered as a virtual switch, in the VTEP, that performs layer 2 forwarding based on the VXLAN. The VSI has a function of a conventional Ethernet switch. The function of the conventional Ethernet switch includes source MAC address learning, MAC address aging, and flooding. The VSI is corresponding to a VXLAN network segment.

Figure 8:
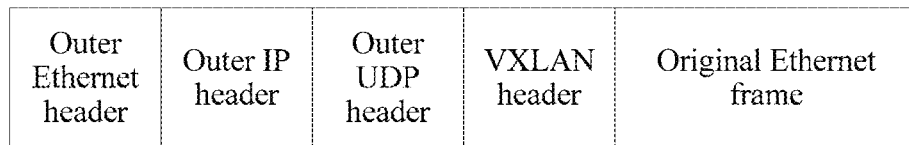
FIG. 8 is a schematic encapsulation diagram of a VXLAN packet according to an embodiment of the present invention.

For an encapsulation format of a VXLAN packet, refer to FIG. 8. A packet encapsulation process may be completed in the VTEP. As shown in FIG. 8, an 8-byte VXLAN header may be used to encapsulate an original Ethernet frame, to obtain a VXLAN packet. The original Ethernet frame comes from a VM, and the original Ethernet frame includes an Ethernet header and a payload. In some embodiments, the payload of the original Ethernet frame includes an IP header and/or a UDP header. An 8-byte UDP header is used to encapsulate the VXLAN packet, to obtain a UDP packet. A 20-byte IP header is used to encapsulate the UDP packet, to obtain an IP packet. A 16-byte Ethernet header is used to encapsulate the IP packet, to obtain an encapsulated packet. The encapsulated packet belongs to an Ethernet frame. It can be learned that a VXLAN technology relates to a packet in a MAC-in-UDP format. The original Ethernet frame includes the Ethernet header and the payload. The payload of the original Ethernet frame may include the IP header and/or the UDP header. To distinguish between different UDP headers, in this application, the UDP header included in the payload of the original Ethernet frame is referred to as an inner UDP header, and the UDP header used to encapsulate the VXLAN packet is referred to as an outer UDP header. It should be noted that the VXLAN packet includes the original Ethernet frame. To distinguish between different IP headers, in this application, the IP header included in the payload of the original Ethernet frame is referred to as an inner IP header, and the IP header used to encapsulate the UDP packet is referred to as an outer IP header. It should be noted that the UDP packet includes the VXLAN packet. To distinguish between different Ethernet headers, in this application, the Ethernet header in the original Ethernet frame is referred to as an inner Ethernet header, and the Ethernet header used to encapsulate the IP packet is referred to as an outer Ethernet header. It should be noted that the IP packet includes the UDP packet.

In this embodiment of the present invention, unless otherwise specified, the encapsulated packet is a packet that includes a VXLAN payload, a VXLAN header, an outer UDP header, an outer IP header, and an outer Ethernet header. The VXLAN payload includes the original Ethernet frame. The original Ethernet frame comes from the VM. The VXLAN header carries a VNI. The VNI in the VXLAN header identifies that the packet in which the VXLAN header is located is a VXLAN packet. A value of a destination port of the outer UDP header is equal to 4789. The outer IP header includes a source IP address and a destination IP address. The source IP address is an IP address of a VTEP device to which the VM sending the original Ethernet frame belongs. For example, as shown in FIG. 1, the VM 11 sends an original Ethernet frame to the first VTEP device, and the first VTEP device performs VXLAN encapsulation on the original Ethernet frame. In this case, the source IP address is an IP address of the first VTEP device. The destination IP address needs to be determined based on a VXLAN packet implementation. The outer Ethernet header includes a source MAC address and a destination MAC address. The source MAC address is a MAC address of the VTEP device to which the VM sending the original Ethernet frame belongs, and the destination MAC is a MAC address of a next-hop device of the VTEP device to which the VM sending the original Ethernet frame belongs.

The encapsulated packet may be used in a scenario in which two VTEP devices directly communicate by using a VXLAN tunnel. The direct communication means that the two VTEP devices communicate only by using the VXLAN tunnel or that the two VTEP devices communicate only by using the VXLAN tunnel and a network device that does not perceive the VXLAN packet in the encapsulated packet. The skipping perceiving the VXLAN packet in the encapsulated packet means skipping parsing the VXLAN packet. For example, in a possible implementation scenario in which the two VTEP devices communicate only by using the VXLAN tunnel, the first VTEP device bidirectionally communicates with the second VTEP device by using the VXLAN tunnel. In a possible implementation scenario in which the two VTEP devices communicate only by using the VXLAN tunnel and the network device that does not perceive the VXLAN packet in the encapsulated packet, the first VTEP device bidirectionally communicates with the second VTEP device by using the VXLAN tunnel and a provider (P) device. The P device is a network device that does not perceive the VXLAN packet. As shown in FIG. 1, the first VTEP device is connected to the second VTEP device by using the first VXLAN tunnel. The first VXLAN tunnel passes through the IP network. The IP network may include at least one P device.

In a scenario in which two VTEP devices indirectly communicate by using a VXLAN tunnel, a network device having a capability of perceiving the VXLAN packet in the encapsulated packet exists between the two VTEP devices. In other words, the VXLAN tunnel between the two VTEP devices includes at least one network device having the capability of perceiving the VXLAN packet. For example, a VXLAN layer 3 gateway needs to be used in a scenario in which VMs that belong to different VXLAN network segments interwork.

The VXLAN packet implementation mentioned above may include forwarding unicast traffic and flooding traffic. After receiving an original Ethernet frame from a VM, a transmit-end VTEP device performs determining based on the original Ethernet frame, to determine to perform processing based on a unicast traffic forwarding procedure, or to perform processing based on a traffic flooding procedure.

The forwarding unicast traffic is as follows: A known unicast forwarding procedure is implemented based on a destination IP address in an outer IP header in an encapsulated packet. The destination IP address in the outer IP header in the encapsulated packet is an IP address of a VTEP device to which a destination VM belongs. The destination VM is a VM that needs to bidirectionally communicate with the VM sending the original Ethernet frame.

The flooding traffic belongs to a broadcast, unknown unicast, and multicast (BUM) forwarding procedure. Based on different replication manners, a traffic flooding manner may be implemented in a unicast routing manner, a multicast routing manner, or a flood agent manner.

The unicast routing manner is a head-end replication implementation. To be specific, in the unicast routing manner, the transmit-end VTEP device is responsible for replicating an Ethernet frame received from a VM, encapsulating the replicated Ethernet frame into a VXLAN packet, and encapsulating the VXLAN packet by using an outer UDP header, an outer IP header, and an outer Ethernet header, to obtain an encapsulated packet. The encapsulated packet is sent to a local site in a unicast manner by using a local interface other than a receive port. The local interface is a connection interface between the transmit-end VTEP device and the VM or between the transmit-end VTEP device and a server in which the VM is located. The local site is a VM connected to the transmit-end VTEP device or a server in which a VM connected to the transmit-end VTEP device is located. The transmit-end VTEP device further sends the encapsulated packet to a receive-end VTEP device other than the transmit-end VTEP device in the VXLAN by using a VXLAN tunnel. Therefore, a destination IP address in the outer IP header in the encapsulated packet is an IP address of the receive-end VTEP device.

The multicast routing manner is a core replication implementation. To be specific, in the multicast routing manner, all VTEP devices in a same VXLAN network segment join a same multicast group, and a multicast forwarding entry is established for the multicast group in an IP network by using a multicast routing protocol (such as the Protocol Independent Multicast (PIM) protocol). After receiving flooded traffic, the transmit-end VTEP device not only performs flooding in a local site, but also encapsulates the flooded traffic by using a multicast destination IP address. An encapsulated packet is forwarded to a receive-end VTEP device based on the established multicast forwarding entry. Therefore, a destination IP address in an outer IP header in the encapsulated packet is a multicast address.

The flood agent manner is a server replication implementation. To be specific, in the flood agent manner, all VTEP devices in a same VXLAN network segment establish tunnels with a proxy server in a manual manner. After receiving flooded traffic, the transmit-end VTEP device not only performs flooding in a local site, but also sends the flooded traffic to the proxy server. The proxy server forwards the flooded traffic to another receive-end VTEP. Therefore, a destination IP address in an outer IP header in an encapsulated packet is an IP address of the proxy server. In addition, the proxy server modifies the outer IP header after receiving the packet, so that a source IP address is the IP address of the proxy server, and the destination IP address is an IP address of a VTEP device other than the transmit-end VTEP device.

With reference to FIG. 1, an implementation process of forwarding a VXLAN packet is described by using an example of forwarding unicast traffic. Specifically, an example in which the VM 11 sends an Ethernet frame to the VM 21 is used for description. It is assumed that the VM 11 and the VM 21 belong to a VXLAN network segment 1, and a VNI corresponding to the VXLAN network segment 1 is a VNI 100. An IP address of the VM 11 is 10.10.10.10, and an IP address of the VM 21 is 10.10.10.20. The first VTEP device receives the Ethernet frame from the VM 11. A specific form of the Ethernet frame is the original Ethernet frame mentioned above. For the first VTEP device, an access mode of the VM 11 may be a virtual local area network (VLAN) access mode or an Ethernet access mode. After receiving the Ethernet frame, the first VTEP device obtains a corresponding layer 2 broadcast domain based on a correspondence between the Ethernet frame and a port for receiving the Ethernet frame and VLAN information carried in the Ethernet frame, where the receive port is an interface that is on the first VTEP device and that is used for communication with the VM 11, and the VLAN information includes a VLAN tag (VLAN tag). Then, the first VTEP device determines whether a destination MAC address in the Ethernet frame is a known unicast MAC address; and if the Ethernet frame is a known unicast packet, processes the Ethernet frame based on a known unicast forwarding procedure; or otherwise, processes the Ethernet frame based on a BUM forwarding procedure. For example, the destination MAC address in the Ethernet frame is a MAC address of the VM 21, and the first VTEP device has learned the MAC address of the VM 21. In this case, the first VTEP device processes the Ethernet frame based on the known unicast forwarding procedure. The first VTEP device determines, based on the Ethernet frame, that the VNI is the VNI 100, and determines an IP address of the remote second VTEP device. For example, the IP address of the second VTEP device is 2.2.2.2. The first VTEP device encapsulates the Ethernet frame into a VXLAN packet based on the VNI 100, the IP address of the second VTEP device, and the IP address (for example, 1.1.1.1) of the first VTEP device, and encapsulates the VXLAN packet by using an outer UDP header, an outer IP header, and an outer Ethernet header, to obtain an encapsulated packet. In addition, the first VTEP device forwards the encapsulated packet to the second VTEP device by using the first VXLAN tunnel. After receiving the encapsulated packet, the second VTEP device decapsulates the encapsulated packet to obtain the outer UDP header, the outer IP header, a VXLAN header, and the original Ethernet frame that are in the encapsulated packet. The second VTEP device determines validity of the VXLAN packet based on a destination port in the outer UDP header, a source IP address in the outer IP header, a destination IP address in the outer IP header, and a VNI in the VXLAN header, and the second VTEP device determines a corresponding layer 2 broadcast domain based on the VNI. The second VTEP device searches for an egress interface and adds a VLAN tag of the VM 21 based on the destination MAC address in the original Ethernet frame, and then sends, to the VM 21 by using the egress interface, the Ethernet frame to which the VLAN tag of the VM 21 is added, to complete forwarding of the Ethernet frame.

According to the foregoing description, the VXLAN has a relatively good solution at a VXLAN data plane. However, a VXLAN control plane solution is not defined in the VXLAN technology. Though a BGP EVPN may be used to implement a VXLAN control plane, the BGP is relatively complex. Therefore, implementing the VXLAN control plane by using the BGP is relatively complex.

The embodiments of the present invention provide a packet processing method, a device, and a packet processing system, to help reduce overheads and complexity of implementing a VXLAN control plane.

In the embodiments of the present invention, unless otherwise specified, IP may be the Internet Protocol version 4 (IPv4), may be the Internet Protocol version 6 (IPv6), or may be IP in the future.

FIG. 2 to FIG. 7A and FIG. 7B are flowcharts of packet processing methods according to the embodiments of the present invention. To clearly describe the packet processing methods in the embodiments of the present invention, the embodiments are described with reference to schematic encapsulation diagrams of VXLAN packets shown in FIG. 9 to FIG. 11 and a diagram of an encapsulation format of a VXLAN header shown in FIG. 12, and are illustrated with reference to the schematic structural diagram of the VXLAN network shown in FIG. 1. It should be understood that implementations shown in FIG. 9 to FIG. 12 are merely some but not all of implementations of the technical solutions provided in this application. In all the embodiments of the present invention, an example in which a first VTEP device sends control information to a second VTEP device is used for description. It should be understood that an implementation process in which the second VTEP device sends control information to the first VTEP device is the same as an implementation process in which the first VTEP device sends the control information to the second VTEP device. In other words, a role of the first VTEP device and that of the second VTEP device may be interchanged.

Figure 2:
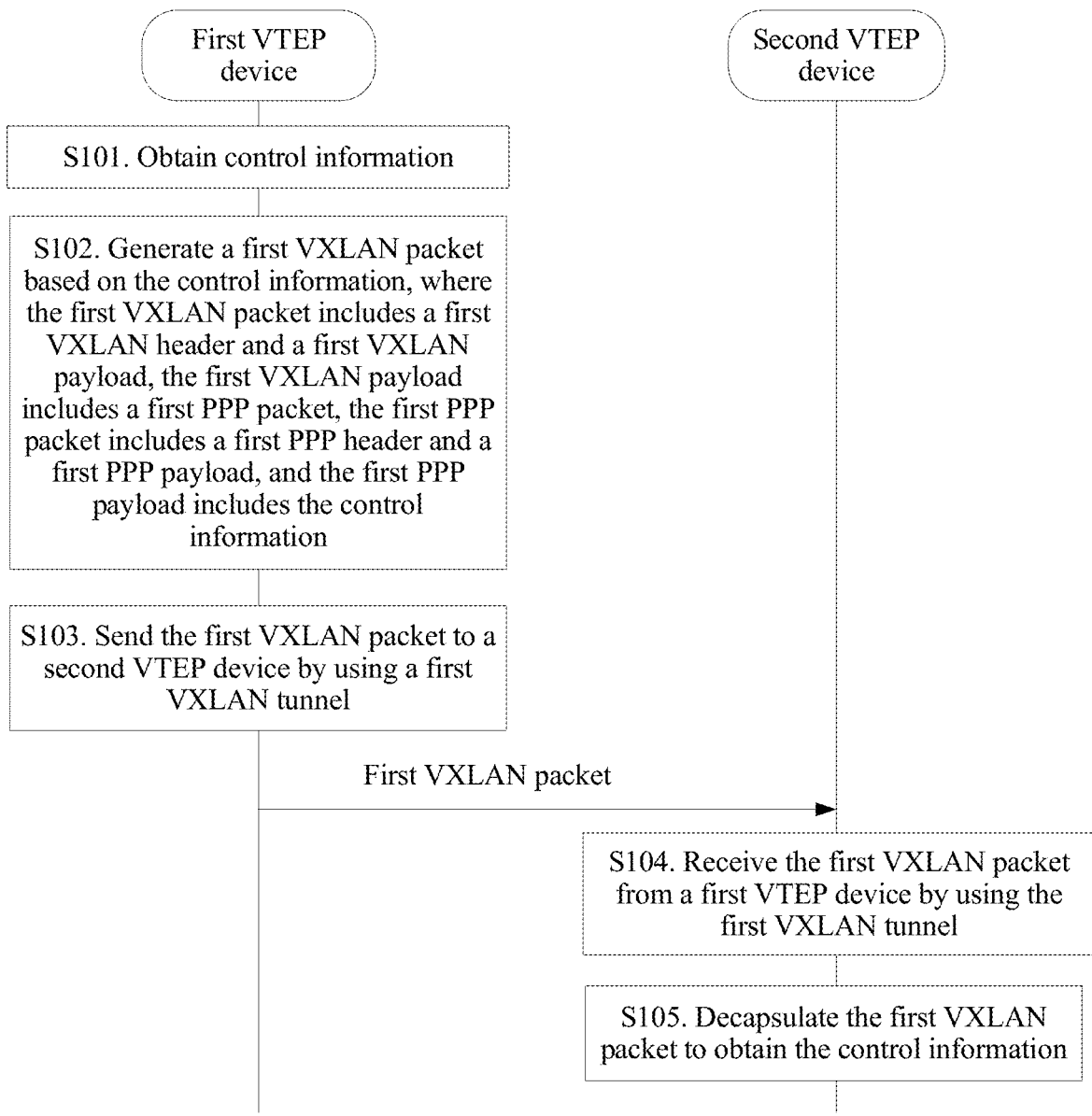
FIG. 2 is a flowchart of a packet processing method according to an embodiment of the present invention.

FIG. 2 is a flowchart of a packet processing method according to an embodiment of the present invention. The method includes the following steps.

S101. A first VTEP device obtains control information, where the control information is for implementing a function defined in the Point-to-Point Protocol (PPP).

During use of a VXLAN control plane, VTEP devices at both ends of a VXLAN tunnel need to transmit control information to each other. For example, a local VTEP device sends control information to a remote VTEP device by using a VXLAN tunnel, or the remote VTEP device sends control information to the local VTEP device by using the VXLAN tunnel. Before sending control information, a VTEP device first needs to obtain the control information. The control information is information that is in the VXLAN control plane and that is used by the VTEP device to implement the function defined in the PPP, to enhance communication in the VXLAN control plane. In this embodiment of the present invention, for example, the control information may include authentication request information, an echo packet, a MAC address or routing information of the VTEP device, or the like. For example, in the scenario shown in FIG. 1, if the first VTEP device wants to send control information to the second VTEP device by using the first VXLAN tunnel, the first VTEP device needs to obtain the control information before sending the control information.

The control information is generated based on a network control task that needs to be executed or a control function that needs to be implemented, and the generated control information conforms to the function defined in the PPP. For example, a VTEP device needs to perform connectivity detection on a VXLAN tunnel. The VTEP device generates corresponding control information based on a network control task for performing connectivity detection on the VXLAN tunnel, and the generated control information needs to conform to the function defined in the PPP. In this case, the generated control information is an echo packet. The network control task or the control function may be triggered in any one of the following manners but unnecessarily in the following manners: The network control task or the control function is triggered by the VTEP device based on a preset rule, statically configured by a network administrator on the VTEP device, or delivered to the VTEP by a controller connected to the VTEP device. The controller is a control device located on an upstream of the VTEP device. An independent device may serve as the controller, or a plurality of devices may be combined into a logic controller. The controller is configured to connect at least one VTEP device. For example, in the scenario shown in FIG. 1, a controller (not shown in FIG. 1) is configured to connect the first VTEP device and the second VTEP device. In a software-defined networking (SDN) scenario, the controller may include an SDN controller.

S102. The first VTEP device encapsulates the control information to obtain a first VXLAN packet, where the first VXLAN packet includes a first VXLAN header and a first VXLAN payload, the first VXLAN payload includes a first PPP packet, the first PPP packet includes a first PPP header and a first PPP payload, and the first PPP payload includes the control information.

A VXLAN packet mentioned in this embodiment and subsequent embodiments carries a PPP header. Therefore, the VXLAN packet that carries a PPP header may also be referred to as a PPP over VXLAN packet. The PPP over VXLAN packet may also be considered as a VXLAN packet that carries a PPP packet, to resolve a technical problem, mentioned above in this application, that exists in the VXLAN control plane. In this embodiment and the subsequent embodiments, the VXLAN packet is equivalent to the PPP over VXLAN packet unless otherwise specified or limited.

With reference to the scenario shown in FIG. 1, after generating the control information based on the network control task that needs to be executed or the control function that needs to be implemented, the first VTEP device encapsulates the control information into the first VXLAN packet. For example, a specific execution process in which the first VTEP device encapsulates the control information into the first VXLAN packet is as follows: The first VTEP device performs PPP encapsulation on the control information, to add the first PPP header at an outer layer of the control information, and obtain the first PPP packet. The first PPP packet includes the first PPP header and the first PPP payload, and the first PPP payload includes the control information. Then, VXLAN encapsulation is performed on the first PPP packet, to add the first VXLAN header at an outer layer of the first PPP header, and obtain the first VXLAN packet. The first VXLAN packet includes the first VXLAN header and the first VXLAN payload, and the first VXLAN payload includes the first PPP packet. With reference to the PPP over VXLAN packet mentioned above, in this embodiment of the present invention, the first VXLAN packet may be referred to as a first PPP over VXLAN packet.

A structure of the first VTEP device is not limited in an implementation process in which the first VTEP device encapsulates the control information into the first VXLAN packet. For example, the first VTEP device includes a first PPP processing module and a first VXLAN processing module. The first VTEP device pushes the control information to a PPP protocol stack of the first PPP processing module. The first PPP processing module performs PPP encapsulation on the control information in the PPP protocol stack according to the PPP to obtain the first PPP packet. The first PPP processing module sends the first PPP packet to the first VXLAN processing module. The first VXLAN processing module performs VXLAN encapsulation on the first PPP packet to obtain the first VXLAN packet. The first PPP processing module and the first VXLAN processing module may be implemented in different processors. Alternatively, the first PPP processing module and the first VXLAN processing module are implemented in a same processor. Alternatively, the first PPP processing module is implemented by a PPP processing device independent of the first VTEP device. The PPP processing device is connected to the first VTEP device by using a communications link.

In some embodiments, the control information is not generated by the first VTEP device and then sent to the first PPP processing module. The control information is directly generated by the first PPP processing module based on the network control task that needs to be executed or the control function that needs to be implemented.

An implementation process of performing PPP encapsulation on the control information is performed according to the existing PPP. Details are not described in this application. The first PPP header includes an address field, a control field, and a protocol field. A value filled in the address field is 0xFF, a value filled in the control field is 0x03, and a value filled in the protocol field is determined based on a type of the control information, where "0x" indicates a hexadecimal value.

In an implementation process of performing VXLAN encapsulation on the first PPP packet, alternatively, according to a stipulation in a VXLAN-related protocol, the first VTEP device adds a first outer UDP header at an outer layer of the first VXLAN header, adds a first outer IP header at an outer layer of the first outer UDP header, and adds a first outer Ethernet header at an outer layer of the first outer IP header. The first outer IP header includes a source IP address and a destination IP address. In the scenario shown in FIG. 1, the first VTEP device directly communicates with the second VTEP device bidirectionally by using the tunnel. The source IP address is an IP address of the first VTEP device, and the destination IP address is an IP address of the second VTEP device. The first outer Ethernet header includes a source MAC address and a destination MAC address, the source MAC address is a MAC address of the first VTEP device, and the destination MAC is a MAC address of a next hop of the first VTEP device. In some embodiments, another network device that needs to perceive the VXLAN packet, for example, a layer 3 gateway, may exist between the first VTEP device and the second VTEP device.

Figure 9:
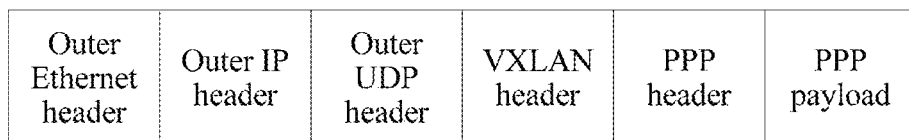
FIG. 9 is a schematic encapsulation diagram of another VXLAN packet according to an embodiment of the present invention.

FIG. 9 is a schematic encapsulation diagram of a VXLAN packet according to an embodiment of the present invention. An encapsulation format shown in FIG. 9 may be used to implement the first VXLAN packet mentioned above. A PPP payload (PPP payload) shown in FIG. 9 includes the control information mentioned above. As shown in FIG. 9, a PPP header and a VXLAN header are sequentially added at an outer layer of the PPP payload, to obtain the first VXLAN packet. In addition, according to a VXLAN-related protocol, an outer UDP header, an outer IP header, and an outer Ethernet header are sequentially added at an outer layer of the VXLAN header, to obtain an encapsulated packet. The encapsulated packet belongs to an Ethernet frame. As shown in FIG. 9, the outer UDP header, the outer IP header, and the outer Ethernet header are sequentially added at an outer layer of the VXLAN packet, so that the VXLAN packet can be normally transmitted in a network. It should be understood that, in this embodiment and subsequent embodiments, a used VXLAN packet (for example, the first VXLAN packet) does not exclude an outer UDP header, an outer IP header, and an outer Ethernet header.

S103. The first VTEP device sends the first VXLAN packet to a second VTEP device by using a first VXLAN tunnel.

With reference to FIG. 1, after generating the first VXLAN packet, the first VTEP device sends the first VXLAN packet to the first VXLAN tunnel by using a connection port between the first VTEP device and the first VXLAN tunnel. The port is referred to as an ingress port of the first VXLAN tunnel. The first VXLAN packet passes through an IP network by using the first VXLAN tunnel, and arrives at the second VTEP device by using a connection port between the second VTEP device and the first VXLAN tunnel. The port is referred to as an egress port of the first VXLAN tunnel. Definition of an ingress port and that of an egress port are determined based on a transmission direction of a VXLAN packet relative to a VXLAN tunnel. The ingress port is a port through which the VXLAN packet enters the VXLAN tunnel. The egress port is a port through which the VXLAN packet goes out from the VXLAN tunnel. Specifically, when the VXLAN packet is sent by the first VTEP device to the second VTEP device by using the first VXLAN tunnel, the port through which the first VTEP device is connected to the first VXLAN tunnel is an ingress port, and the port through which the second VTEP device is connected to the first VXLAN tunnel is an egress port. When the VXLAN packet is sent by the second VTEP device to the first VTEP device by using the first VXLAN tunnel, the port through which the second VTEP device is connected to the first VXLAN tunnel is an ingress port, and the port through which the first VTEP device is connected to the first VXLAN tunnel is an egress port. In addition, for a same port, after a packet output direction of the port is disabled, a packet input direction of the port is not affected.

S104. The second VTEP device receives the first VXLAN packet from the first VTEP device by using the first VXLAN tunnel.

S105. The second VTEP device decapsulates the first VXLAN packet to obtain the control information.

With reference to FIG. 1, after receiving the first VXLAN packet, the second VTEP device decapsulates the first VXLAN packet, and determines validity of the first VXLAN packet based on the source IP address and the destination IP address in the first outer IP header, a port number in the first outer UDP header, and a VNI in the first VXLAN header. When the first VXLAN packet is valid, the first outer IP header, the first outer UDP header, and the first VXLAN header are removed to obtain the first PPP packet. The first PPP packet carries the control information. The second VTEP device parses the first PPP packet to obtain the control information, and executes the corresponding network control task based on the control information or implements the corresponding control function based on the control information.

A structure of the second VTEP device is not limited in an implementation process in which the second VTEP device decapsulates the first VXLAN packet. For example, the second VTEP device includes a second PPP processing module and a second VXLAN processing module. The second VXLAN processing module performs VXLAN decapsulation on the first VXLAN packet to obtain the first PPP packet. The second VXLAN processing module sends the first PPP packet to a PPP protocol stack of the second PPP processing module. The second PPP processing module performs PPP decapsulation on the first PPP packet in the PPP protocol stack according to the PPP to obtain the control information, and executes the corresponding network control task based on the control information or implements the corresponding control function based on the control information. The second PPP processing module and the second VXLAN processing module may be implemented in different processors. Alternatively, the second PPP processing module and the second VXLAN processing module are implemented in a same processor. Alternatively, the second PPP processing module is implemented by a PPP processing device independent of the second VTEP device. The PPP processing device is connected to the second VTEP device by using a communications link.

According to the packet processing method provided in this embodiment, a VTEP device at one end of a VXLAN tunnel generates a PPP over VXLAN packet that carries control information, and transmits the PPP over VXLAN packet to a VTEP device at the other end of the VXLAN tunnel by using the VXLAN tunnel; and the VTEP device at the other end of the VXLAN tunnel may perform, based on the control information in the PPP over VXLAN packet, a function defined in PPP. In the foregoing technical solution, the PPP is introduced into the VXLAN control plane. The VXLAN control plane may be implemented by using the PPP. BGP is more complex than the PPP. Compared with a technical solution of implementing a VXLAN control plane by using the BGP, the technical solution of implementing the VXLAN control plane by using the PPP helps reduce overheads and complexity of implementing the VXLAN control plane, and ensures that simple VXLAN control plane communication is implemented during use of the VXLAN control plane.

In some embodiments, the first VXLAN header includes first identification information, and the first identification information is used to identify that the first VXLAN payload includes the first PPP packet.

To indicate that the first VXLAN packet is a PPP over VXLAN packet, the first identification information may be set in the first VXLAN header in the first VXLAN packet, to identify that the first VXLAN payload includes the first PPP packet. FIG. 12 is a diagram of an encapsulation format of a VXLAN header according to an embodiment of the present invention. As shown in FIG. 12, the fourth byte in the VXLAN header is extended as a protocol field. The protocol field has a length of eight bits, and is used to identify a type of a packet carried in the VXLAN packet. Therefore, the first identification information includes the protocol field. For example, a value of the protocol field is set to 0x05, to identify that the VXLAN payload includes the PPP packet. The packet carries a PPP header, namely, the VXLAN packet is a PPP over VXLAN packet. The value of the protocol field is not limited to 0x05, where "0x" indicates a hexadecimal value. The VXLAN header may further include an enable flag bit of the protocol field. The enable flag bit is used to enable the protocol field. When the enable flag bit is set to 1, the protocol field is valid. For example, in FIG. 12, the fifth bit of the first byte in the VXLAN packet header is set as the enable flag bit of the protocol field. When a value of the bit is 1, the protocol field is valid. In this case, the VTEP device may determine, by reading the protocol field and the enable flag bit of the protocol field, whether the packet is the PPP over VXLAN packet. It should be noted that an implementation, shown in FIG. 12, of extending the protocol field in the VXLAN header is merely an optional implementation. For example, in another possible implementation, alternatively, the protocol field may be set in another reserved field in the VXLAN header.

In some embodiments, a plurality of VXLAN network segments may be deployed on the first VTEP device, that is, more than one VXLAN network segment is deployed on the first VTEP device. In this way, when performing step S102, the first VTEP device may encapsulate the control information based on different granularities to obtain the first VXLAN packet. In a possible implementation, the control information is transmitted by using a VTEP device as a granularity, so that the corresponding network control task is executed based on the control information or the corresponding control function is implemented based on the control information. In another possible implementation, the control information is transmitted by using a VNI as a granularity, so that the corresponding network control task is executed based on the control information or the corresponding control function is implemented based on the control information.

With reference to FIG. 1, an example is used for description. Three VXLAN network segments, for example, a VXLAN network segment 1, a VXLAN network segment 2, and a VXLAN network segment 3, are deployed on the first VTEP device. The three VXLAN network segments are corresponding to different VNIs, respectively. For example, the VXLAN network segment 1 is corresponding to a VNI 1, the VXLAN network segment 2 is corresponding to a VNI 2, and the VXLAN network segment 3 is corresponding to a VNI 3. In other words, different VXLAN network segments are allowed to run on the first VTEP device.

In the implementation of transmitting the control information by using a VTEP device as a granularity, after the first VTEP device obtains control information 1, the first VTEP device is used as a granularity to apply the control information 1 to the VXLAN network segment 1 to the VXLAN network segment 3. Specifically, for the VXLAN network segment 1, the first VTEP device generates a first VXLAN packet 1. The first VXLAN packet 1 includes the control information 1, and a VXLAN header in the first VXLAN packet 1 includes the VNI 1. For the VXLAN network segment 2, the first VTEP device generates a first VXLAN packet 2. The first VXLAN packet 2 includes the control information 1, and a VXLAN header in the first VXLAN packet 2 includes the VNI 2. For the VXLAN network segment 3, the first VTEP device generates a first VXLAN packet 3. The first VXLAN packet 3 includes the control information 1, and a VXLAN header in the first VXLAN packet 3 includes the VNI 3. The first VXLAN packet 1, the first VXLAN packet 2, and the first VXLAN packet 3 each are transmitted by the first VTEP device to the second VTEP device by using the first VXLAN tunnel, so that the same control information is applied to the VXLAN network segment 1 to the VXLAN network segment 3.

In the implementation of transmitting the control information by using a VNI as a granularity, the first VTEP device is allowed to obtain different control information, for example, control information 1 and control information 2. The first VTEP device wants to apply the control information 1 to the VXLAN network segment 1 and the VXLAN network segment 2, and apply the control information 2 to the VXLAN network segment 3, that is, transmits the control information by using a VNI as a granularity. Therefore, the first VTEP device obtains the control information, and obtains a correspondence between the control information and a VNI. Specifically, for the VXLAN network segment 1, the first VTEP device generates a first VXLAN packet 1. The first VXLAN packet 1 includes the control information 1, and a VXLAN header in the first VXLAN packet 1 includes the VNI 1. For the VXLAN network segment 2, the first VTEP device generates a first VXLAN packet 2. The first VXLAN packet 2 includes the control information 1, and a VXLAN header in the first VXLAN packet 2 includes the VNI 2. For the VXLAN network segment 3, the first VTEP device generates a first VXLAN packet 3. The first VXLAN packet 3 includes the control information 2, and a VXLAN header in the first VXLAN packet 3 includes the VNI 3. The first VXLAN packet 1, the first VXLAN packet 2, and the first VXLAN packet 3 each are transmitted by the first VTEP device to the second VTEP device by using the first VXLAN tunnel, so that the different control information is applied to the VXLAN network segment 1 to the VXLAN network segment 3.

In the foregoing implementation, control policies for different VXLAN network segments in a same VTEP device may be deployed.

In the prior art, a VXLAN tunnel may be established in any one of the following three manners: a static configuration manner, a data flow-triggered manner, or a BGP EVPN manner. The static configuration manner is configuring a VXLAN tunnel in a manual manner. For example, a network administrator directly and statically configures a VXLAN tunnel on a VTEP device. For another example, a network administrator statically configures a VXLAN tunnel on a controller, or the controller automatically and statically configures a VXLAN tunnel based on a preset allocation rule, and then the controller delivers the VXLAN tunnel to a VTEP device. The controller may be an SDN controller. The data flow-triggered manner is a VXLAN tunnel establishment manner that is based on data plane self-learning. Specifically, in the multicast routing manner mentioned above, a local VTEP device receives multicast VXLAN data traffic sent by a remote VTEP device, and dynamically establishes a VXLAN tunnel based on a VNI and a source IP address in a VXLAN packet. The BGP EVPN manner is a manner in which the BGP EVPN protocol is used to discover a VTEP device and automatically generate a VXLAN tunnel. Specifically, the VTEP establishes a BGP neighbor relationship connection to a controller. The VTEP device serves as a client, and the controller serves as a route reflector (RR). The controller may be an SDN controller. A VNI broadcast domain is newly added on a local VTEP, and an updated inclusive multicast route is generated. In addition, the local VTEP revokes the inclusive multicast route when an Ethernet virtual network (EVN) is deleted or a VNI broadcast domain is deleted from an EVN instance. The local VTEP sends the inclusive multicast route to the controller serving as a BGP peer. The inclusive multicast route carries a VNI, an IP address of the local VTEP device, and an IP address of a remote VTEP device. The controller triggers an RR function to send the inclusive multicast route to the remote VTEP device. After receiving the inclusive multicast route, the remote VTEP dynamically generates a VXLAN tunnel and a head-end replication table based on the VNI, the IP address of the local VTEP device, and the IP address of the remote VTEP device that are carried in the inclusive multicast route. However, regardless of a specifically used VXLAN tunnel establishment manner, after the VXLAN tunnel is established, an unauthorized VTEP device at one end of the VXLAN tunnel may establish the VXLAN tunnel with a VTEP device at the other end of the VXLAN tunnel because of a lack of a VTEP device authentication process.

Figure 3A:
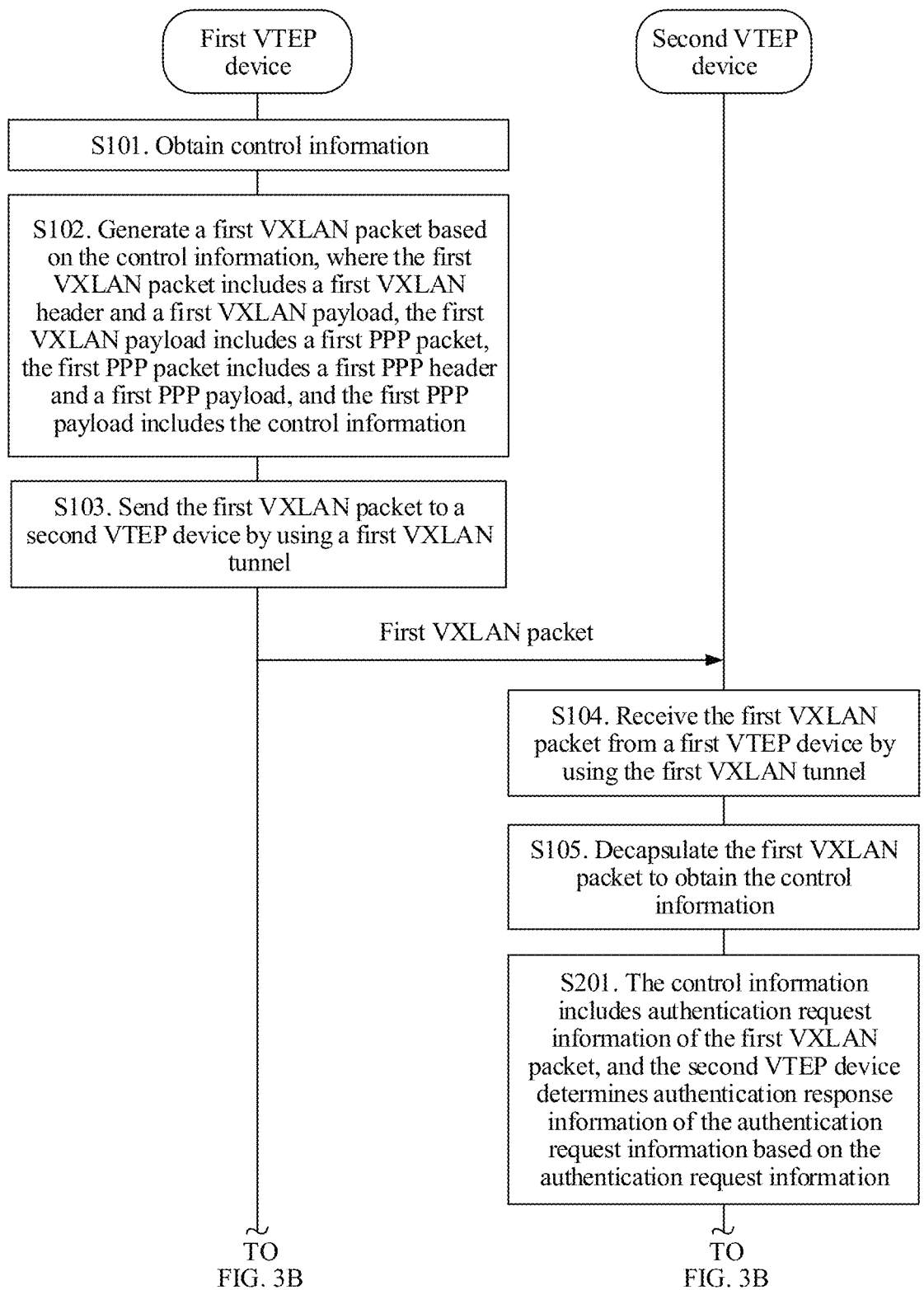
FIG. 3A and FIG. 3B are a flowchart of another packet processing method according to an embodiment of the present invention.
Figure 3B:
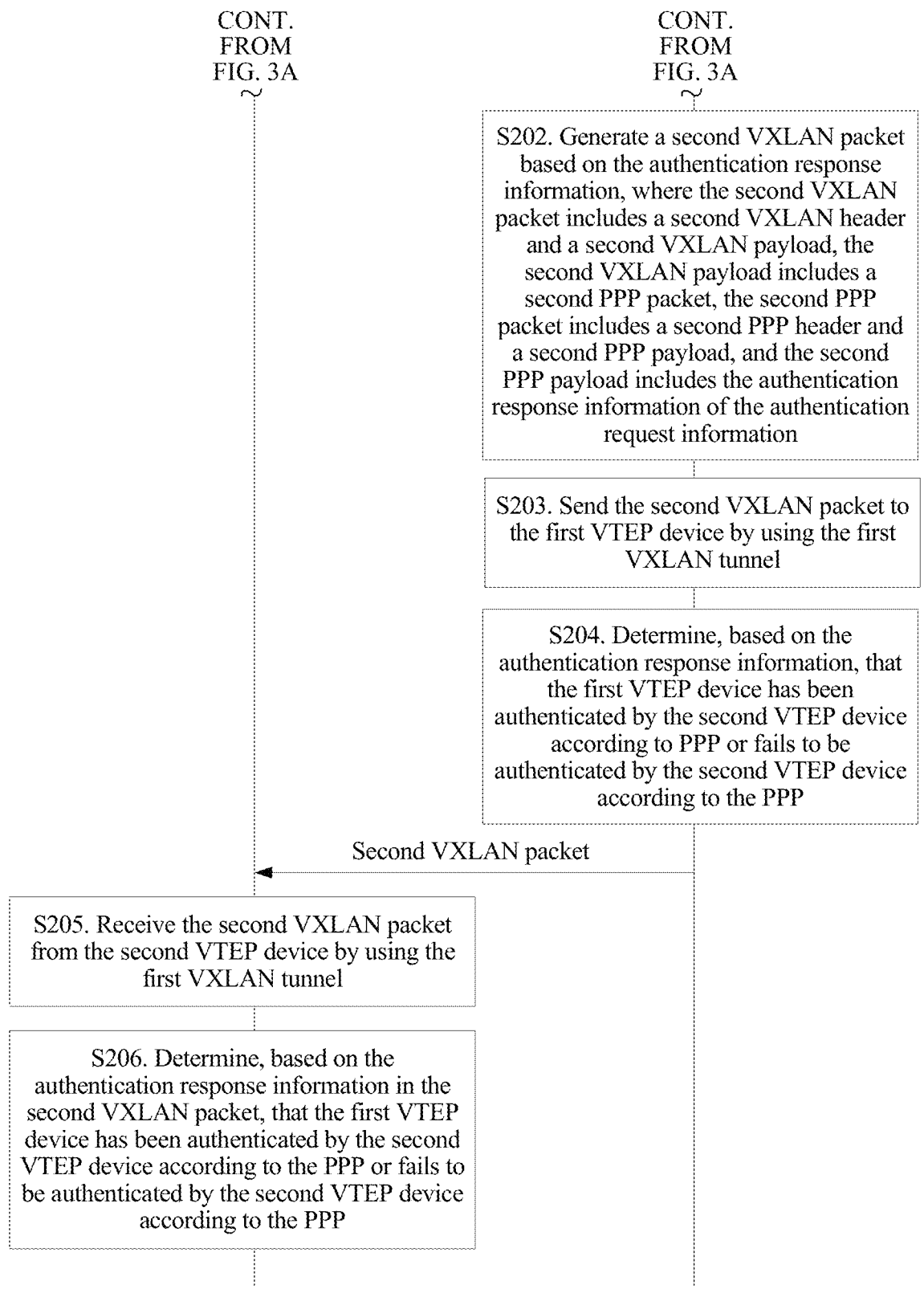

Based on the foregoing problem, in some embodiments, FIG. 3A and FIG. 3B show a packet processing method for implementing authentication on a VTEP device by using the packet processing method shown in FIG. 2. For an implementation process of steps S101 to S105 in the method shown in FIG. 3A and FIG. 3B, refer to the corresponding descriptions in FIG. 2 in the foregoing embodiment. In S101, the control information includes authentication request information, and the authentication request information is for implementing an authentication function defined in the PPP. With reference to FIG. 1, after the first VXLAN tunnel between the first VTEP device and the second VTEP device is established in any one of the foregoing three manners, a VTEP device authentication process is triggered. For a condition of triggering start of authentication, in a possible implementation, when a controller determines that the first VXLAN tunnel is already established, the controller sends an authentication starting control message to the first VTEP device and the second VTEP device. After receiving the authentication starting control message from the controller, the first VTEP device and the second VTEP device trigger a corresponding authentication process. In another possible implementation, when actively determining that the first VXLAN tunnel is already established, the first VTEP device and the second VTEP device trigger a corresponding authentication process.

The first VTEP device obtains the authentication request information after the authentication process is triggered. In the method shown in FIG. 3A and FIG. 3B, the authentication request information may be generated by the first VTEP device. The authentication request information includes a user name and a password. The user name is a user name of the first VTEP device. The user name may be generated based on a device identifier of the first VTEP device. The device identifier may be a MAC address, a device serial number, or the like of the first VTEP device. Alternatively, the user name may be generated based on a VXLAN network segment. When a plurality of VXLAN network segments are deployed on the first VTEP device, a method for generating a user name based on a VXLAN network segment helps implement authentication on a VTEP device corresponding to some of a plurality of VXLAN network segments.

In some embodiments, the first VTEP device includes a first PPP processing module and a first VXLAN processing module. The first PPP processing module and the first VXLAN processing module encapsulate the authentication request information by using the implementation of the foregoing embodiment, to obtain the first VXLAN packet.

In some embodiments, the authentication request information may be generated by the first PPP processing module in the first VTEP device.

Specifically, the method shown in FIG. 3A and FIG. 3B further includes the following steps.

S201. The second VTEP device determines authentication response information of the authentication request information based on the authentication request information.

After obtaining the authentication request information in the first VXLAN packet, the second VTEP device searches a database of the second VTEP device for matched information based on the user name and the password in the authentication request information, to generate the authentication response information of the authentication request information. Specifically, if the second VTEP device can find, in the database, information that matches the user name and the password in the authentication request information, a content indication of the generated authentication response information is "accept", indicating that authentication succeeds. If the second VTEP device cannot find, in the database, information that matches the user name and the password in the authentication request information, a content indication of the generated authentication response information is "reject", indicating that authentication fails.

In some embodiments, the second VTEP device includes a second PPP processing module and a second VXLAN processing module. The second PPP processing module and the second VXLAN processing module decapsulate the first VXLAN packet by using the implementation of the foregoing embodiment, to obtain the authentication request information.

In some embodiments, the authentication response information may be generated by the second PPP processing module in the second VTEP device.

S202. The second VTEP device generates a second VXLAN packet based on the authentication response information, where the second VXLAN packet includes a second VXLAN header and a second VXLAN payload, the second VXLAN payload includes a second PPP packet, the second PPP packet includes a second PPP header and a second PPP payload, and the second PPP payload includes the authentication response information of the authentication request information.

Specifically, for an implementation in which the second VTEP device encapsulates the authentication response information to obtain the second VXLAN packet, refer to the implementation of generating the first VXLAN packet in the foregoing embodiment. Details are not described herein again. Therefore, the second VXLAN packet obtained by encapsulating the authentication response information by the second VTEP device may also be referred to as a second PPP over VXLAN packet.

S203. The second VTEP device sends the second VXLAN packet to the first VTEP device by using the first VXLAN tunnel.

S204. The second VTEP device determines, based on the authentication response information, that the first VTEP device has been authenticated by the second VTEP device according to the PPP or fails to be authenticated by the second VTEP device according to the PPP.

After obtaining the second VXLAN packet, the second VTEP device sends the second VXLAN packet to the first VTEP device by using the first VXLAN tunnel.

In addition, the second VTEP device determines, based on the authentication response information, whether the first VTEP device has been authenticated by the second VTEP device according to the PPP, to determine whether the second VTEP device and the first VTEP device transmit traffic by using the first VXLAN tunnel.

In some embodiments, in a possible implementation, when the second VTEP device determines that the authentication response information is "authentication succeeds", the second VTEP device determines that a status of the first VXLAN tunnel is up (up indicates enabled). When the authentication response information is "authentication succeeds", it indicates that the second VTEP device determines the first VTEP device as an authorized VTEP device, and the second VTEP device may enable a port through which the second VTEP device is connected to the first VXLAN tunnel, so that the second VTEP device can send a VXLAN packet to the first VXLAN tunnel, and the second VTEP device is allowed to receive a VXLAN packet from the first VTEP device.

In some embodiments, in another possible implementation, when the second VTEP device determines that the authentication response information is "authentication fails", the second VTEP device determines that a status of the first VXLAN tunnel is down (down indicates disabled). When the authentication response information is "authentication fails", it indicates that the second VTEP device determines the first VTEP device as an unauthorized VTEP device, and the second VTEP device may disable a port through which the second VTEP device is connected to the first VXLAN tunnel, so that the second VTEP device does not send a VXLAN packet to the first VXLAN tunnel, and the second VTEP device refuses to receive a VXLAN packet from the first VTEP device.

In the foregoing implementation, after the second VTEP device disables the port through which the second VTEP device is connected to the first VXLAN tunnel, only a data packet in a data plane is affected, but a control packet at a control plane is not affected. Therefore, after the port of the second VTEP device is disabled, a data packet from the first VTEP device is blocked at the port of the second VTEP device, or the second VTEP device discards the data packet. The second VTEP device neither processes the data packet nor forwards the data packet. In addition, the second VTEP device does not send a data packet to the first VTEP device.

S205. The first VTEP device receives the second VXLAN packet from the second VTEP device by using the first VXLAN tunnel.

S206. The first VTEP device determines, based on the authentication response information in the second VXLAN packet, that the first VTEP device has been authenticated by the second VTEP device according to the PPP or fails to be authenticated by the second VTEP device according to the PPP.

After receiving the second VXLAN packet, the first VTEP device decapsulates the second VXLAN packet to obtain the authentication response information. For an implementation in which the first VTEP device decapsulates the second VXLAN packet, refer to the implementation of decapsulating the first VXLAN packet in the foregoing embodiment. Details are not described herein again. With reference to explanation in S201, when the authentication response information is "authentication succeeds", the first VTEP device determines that an authentication status of the first VTEP device is "authentication succeeds"; or when the authentication response information is "authentication fails", the first VTEP device determines that an authentication status of the first VTEP device is "authentication fails". Further, when determining that the authentication status of the first VTEP device is "authentication succeeds", the first VTEP device may perform a subsequent operation, for example, send the data packet to the second VTEP device.

In the foregoing implementation, the authentication may be implemented on the VTEP device. Specifically, validity of the first VTEP device is determined based on the authentication process performed by the first VTEP device as an authenticated party and the second VTEP device as an authenticating party, to determine whether the second VTEP device receives the data packet from the first VTEP device by using the first VXLAN tunnel and sends the data packet to the first VTEP device by using the first VXLAN tunnel. Therefore, the PPP is introduced into a VXLAN control plane, to ensure that a VTEP device authentication mechanism is established during use of the VXLAN control plane, and to determine validity of the VXLAN tunnel. Similarly, alternatively, the first VTEP device may be used as an authenticating party, and the second VTEP device may be used as an authenticated party, to perform the authentication process described in the foregoing embodiment. In some embodiments, authentication processes in the foregoing two directions may be simultaneously performed.

Figure 4A:
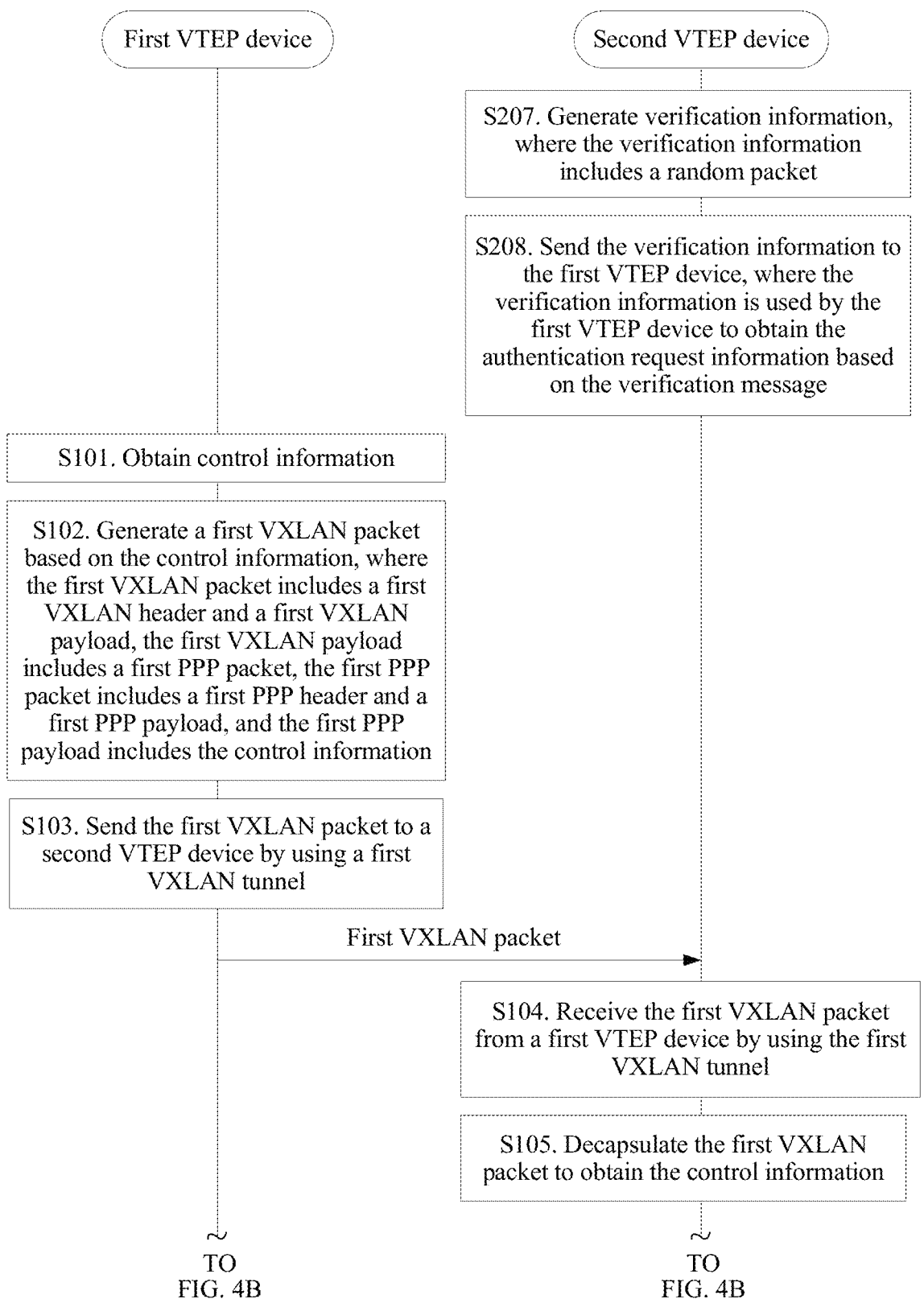
FIG. 4A, FIG. 4B, and FIG. 4C are a flowchart of still another packet processing method according to an embodiment of the present invention.
Figure 4B:
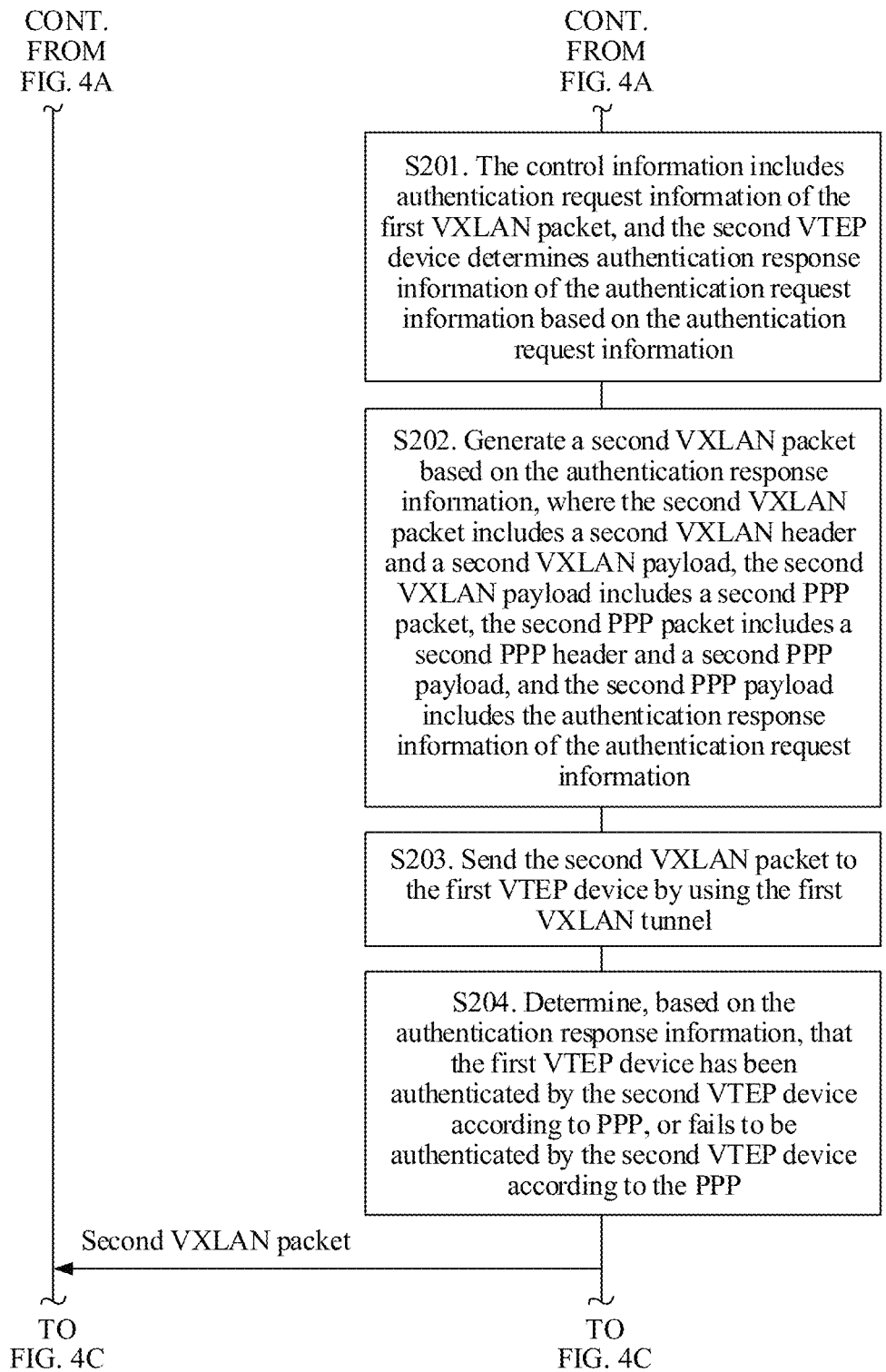
Figure 4C:
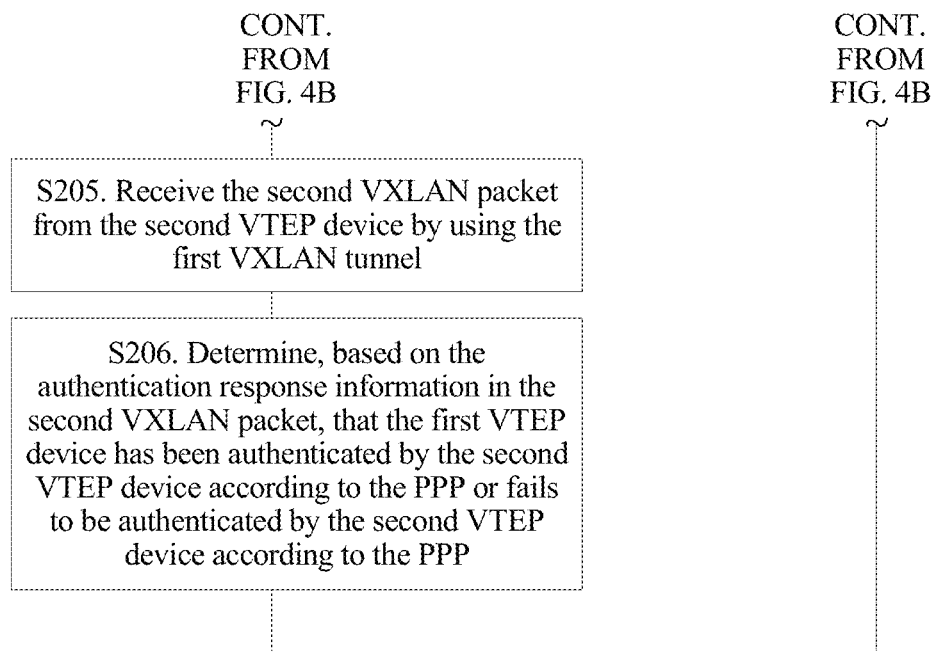

In some embodiments, FIG. 4A, FIG. 4B, and FIG. 4C show another packet processing method for implementing authentication on a VTEP device by using the packet processing method shown in FIG. 2. For an implementation process of steps S101 to S105 and an implementation process of steps S201 to S206 in the method shown in FIG. 4A, FIG. 4B, and FIG. 4C, refer to the corresponding descriptions in FIG. 2 and FIG. 3A and FIG. 3B in the foregoing embodiments. A difference between the VTEP device authentication method implemented in FIG. 4A, FIG. 4B, and FIG. 4C and the VTEP device authentication method implemented in FIG. 3A and FIG. 3B is as follows: Step S207 and step S208 are added in the method shown in FIG. 4A, FIG. 4B, and FIG. 4C; content of authentication request information in the method shown in FIG. 4A, FIG. 4B, and FIG. 4C is different from content of the authentication request information in the method shown in FIG. 3A and FIG. 3B (refer to explanation of step S101 in this implementation); and a manner of determining authentication response information based on the authentication request information in the method shown in FIG. 4A, FIG. 4B, and FIG. 4C is different from a manner of determining the authentication response information based on the authentication request information in the method shown in FIG. 3A and FIG. 3B (refer to explanation of step S201 in this implementation).

Specifically, before step S101, the method shown in FIG. 4A, FIG. 4B, and FIG. 4C further includes the following steps.

S207. The second VTEP device generates verification information, where the verification information includes a random packet.

Different from the method shown in FIG. 3A and FIG. 3B, in the method shown in FIG. 4A, FIG. 4B, and FIG. 4C, an authentication process is initiated by the second VTEP device as an authenticating party instead of the first VTEP device as an authenticated party. The second VTEP device first generates the verification information. The verification information includes the random packet. The random packet is randomly generated by the second VTEP device and is used in the authentication process. In addition, the verification information further includes a packet ID (Identity) and a user name of the second VTEP device. The packet ID is used to identify an authentication serial number. When the first VTEP device and the second VTEP device perform the authentication process shown in FIG. 4A, FIG. 4B, and FIG. 4C, all packets that are transmitted between the first VTEP device and the second VTEP device and used in the authentication process in FIG. 4A, FIG. 4B, and FIG. 4C carry a same packet ID, and the same packet ID is used to indicate that the packets in the authentication process belong to the same authentication process. The user name may be generated based on a device identifier of the second VTEP device. The device identifier may be a MAC address, a device serial number, or the like of the second VTEP device. Alternatively, the user name may be generated based on a VXLAN network segment. When a plurality of VXLAN network segments are deployed on the second VTEP device, a method for generating a user name based on a VXLAN network segment helps implement authentication on a VTEP device corresponding to some of a plurality of VXLAN network segments.

In some embodiments, the verification information may be generated by the second PPP processing module in the second VTEP device.

S208. The second VTEP device sends the verification information to the first VTEP device, where the verification information is used by the first VTEP device to obtain the authentication request information based on the verification information.

An implementation in which the second VTEP device sends the verification information to the first VTEP device is specifically as follows: The second VTEP device encapsulates the verification information into a VXLAN packet that is also referred to as a PPP over VXLAN packet. Then, the VXLAN packet that carries the verification information is sent to the first VTEP device by using the first VXLAN tunnel. For an implementation in which the second VTEP device encapsulates the verification information and sends the VXLAN packet, refer to the implementation of generating and sending the first VXLAN packet in the foregoing embodiment. Details are not described herein again.

After receiving the VXLAN packet that carries the verification information, the first VTEP device decapsulates the VXLAN packet to obtain the verification information. In step S101, the first VTEP device obtains the authentication request information based on the verification information received from the second VTEP device. Specifically, the first VTEP device extracts the user name of the second VTEP device from the verification information, and searches a database of the first VTEP device for a record of the same user name to find a corresponding key in the record. The first VTEP device generates an encrypted packet based on the key, the packet ID, and the random packet by using an encryption algorithm, to obtain the authentication request information. The authentication request information includes the encrypted packet. The encryption algorithm may be a message digest algorithm 5 (MD5). In addition, the authentication request information further includes a user name of the first VTEP device and the packet ID. In the foregoing implementation, the user name of the first VTEP device may be generated based on a device identifier of the first VTEP device, or be generated based on a VXLAN network segment, and is consistent with the user name of the second VTEP device in the verification information in terms of a type. In some embodiments, a process of obtaining the authentication request information based on the verification information may be generated by the first PPP processing module in the first VTEP device.

In step S201, the second VTEP device determines the authentication response information of the authentication request information based on the authentication request information of the first VXLAN packet. Specifically, after obtaining the authentication request information in the first VXLAN packet, the second VTEP device searches, based on the user name of the first VTEP device in the authentication request information, a database of the second VTEP device for a key corresponding to the user name of the first VTEP device. The second VTEP device generates an encrypted verification packet based on the key and the packet ID and the random packet that are in the verification information previously sent to the first VTEP device and by using the same encryption algorithm as the first VTEP device. The second VTEP device compares the encrypted verification packet with the encrypted packet in the authentication request information, and uses a comparison result as the authentication response information of the authentication request information. Specifically, if the comparison result is "same", a content indication of the generated authentication response information is "accept", indicating that authentication succeeds. If the comparison result is "different", a content indication of the generated authentication response information is "reject", indicating that authentication fails. In addition, the authentication response information of the authentication request information further includes the packet ID.

In the foregoing implementation, the authentication may be implemented on the VTEP device. Specifically, validity of the first VTEP device is determined based on the authentication process performed by the first VTEP device as an authenticated party and the second VTEP device as an authenticating party, to determine whether the second VTEP device receives a data packet from the first VTEP device by using the first VXLAN tunnel and sends a data packet to the first VTEP device by using the first VXLAN tunnel. Therefore, the PPP is introduced into a VXLAN control plane, to ensure that a VTEP device authentication mechanism is established during use of the VXLAN control plane, and to determine validity of the VXLAN tunnel. Similarly, alternatively, the first VTEP device may be used as an authenticating party, and the second VTEP device may be used as an authenticated party, to perform the authentication process described in the foregoing embodiment. In some embodiments, authentication processes in the foregoing two directions may be simultaneously performed.

In some embodiments, in scenarios shown in FIG. 3A and FIG. 3B and FIG. 4A, FIG. 4B, and FIG. 4C, a protocol field in a PPP header in a VXLAN packet may be used to identify a type of a used authentication method. For example, in the scenario shown in FIG. 3A and FIG. 3B, a value of a protocol field in a PPP header in each VXLAN packet transmitted between the first VTEP device and the second VTEP device is 0xc023, which is used to identify that the authentication method shown in FIG. 3A and FIG. 3B is used. In the scenario shown in FIG. 4A, FIG. 4B, and FIG. 4C, a value of a protocol field in a PPP header in each VXLAN packet transmitted between the first VTEP device and the second VTEP device is 0xc223, which is used to identify that the authentication method shown in FIG. 4A, FIG. 4B, and FIG. 4C is used, where "0x" indicates a hexadecimal value.

In the prior art, after a VXLAN tunnel is established, there is a lack of a VXLAN tunnel connectivity and keepalive detection mechanism in a VXLAN control plane. Consequently, a local VTEP may be unable to perceive that a remote VTEP is faulty or the VXLAN tunnel is faulty. Data traffic is lost if the local VTEP still forwards the data traffic based on a normal VXLAN forwarding procedure.

Figure 5A:
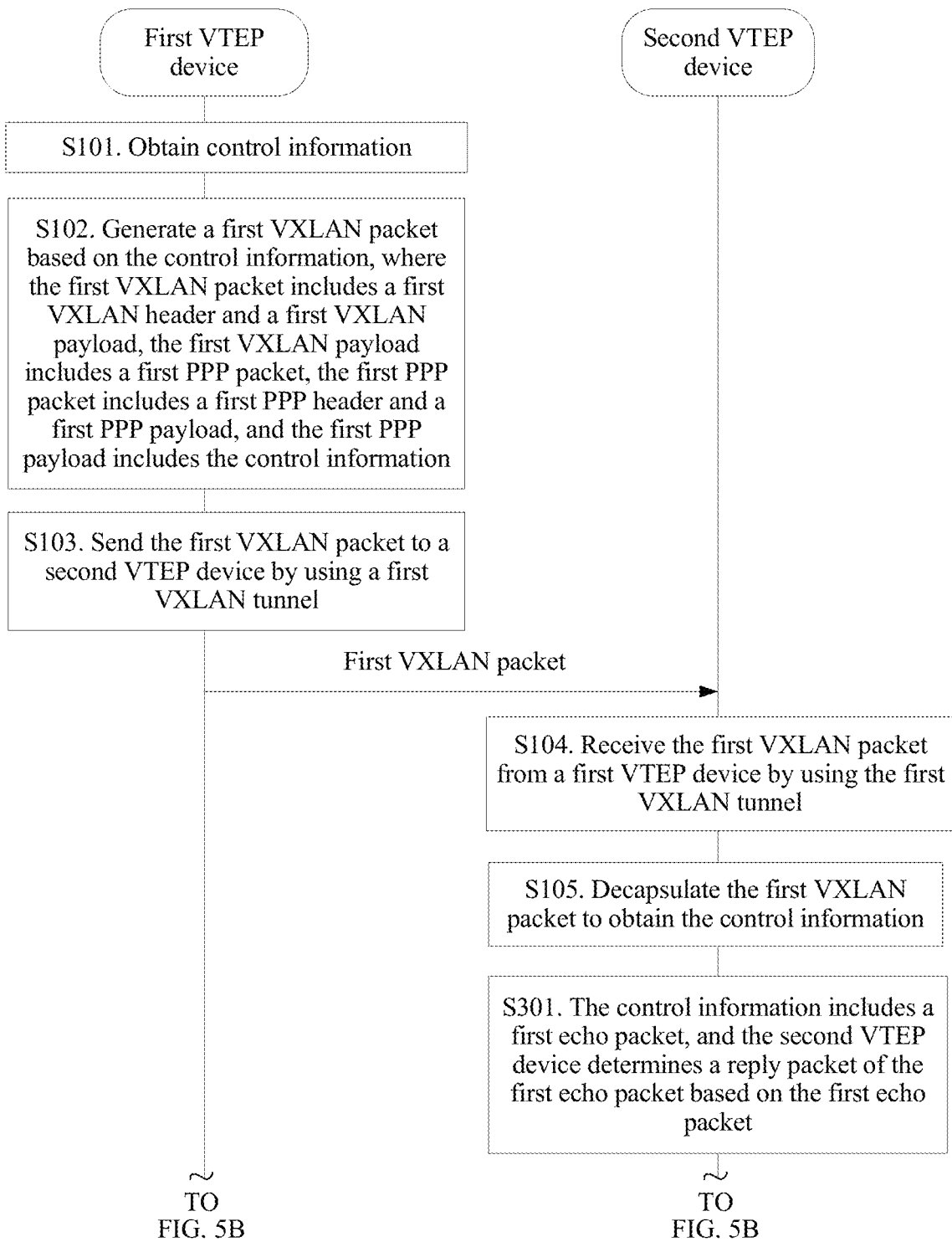
FIG. 5A and FIG. 5B are a flowchart of still another packet processing method according to an embodiment of the present invention.
Figure 5B:
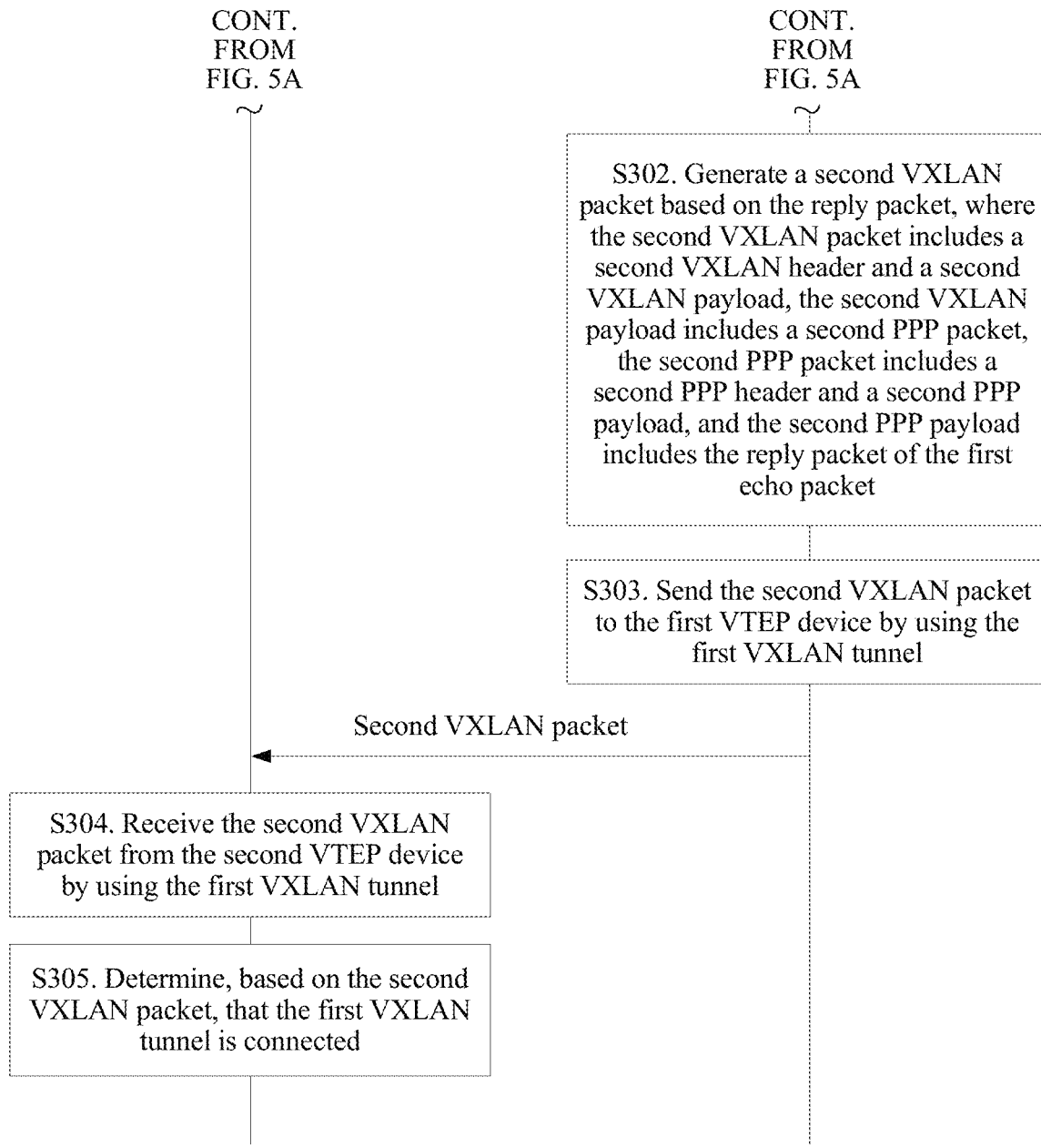

Based on the foregoing problem, in some embodiments, FIG. 5A and FIG. 5B show a packet processing method for implementing a VXLAN tunnel connectivity and keepalive detection mechanism by using the packet processing method shown in FIG. 2. For an implementation process of steps S101 to S105 in the method shown in FIG. 5A and FIG. 5B, refer to the corresponding descriptions in FIG. 2 in the foregoing embodiment. In S101, the control information includes a first echo packet, and the first echo packet is for implementing a connectivity detection function defined in the PPP. The first echo packet is applied to a VXLAN control plane, the first echo packet is used to detect connectivity of a VXLAN tunnel, and the first echo packet is periodically sent to establish a VXLAN tunnel keepalive detection mechanism. In addition, the control information further includes a code field. A value in the code field may be used to identify that the control information includes the first echo packet.

In some embodiments, the first echo packet may be generated by the first PPP processing module in the first VTEP device.

Specifically, the method shown in FIG. 5A and FIG. 5B further includes the following steps.

S301. The second VTEP device determines a reply packet of the first echo packet based on the first echo packet.

After obtaining the first echo packet in the first VXLAN packet, the second VTEP device generates the reply packet of the first echo packet when determining that the first echo packet is an echo packet. Specifically, the second VTEP device may determine, based on the value in the code field, that the first echo packet is an echo packet.

In some embodiments, the reply packet of the first echo packet may be generated by the second PPP processing module in the second VTEP device.

S302. The second VTEP device generates a second VXLAN packet based on the reply packet, where the second VXLAN packet includes a second VXLAN header and a second VXLAN payload, the second VXLAN payload includes a second PPP packet, the second PPP packet includes a second PPP header and a second PPP payload, and the second PPP payload includes the reply packet of the first echo packet.

Specifically, for an implementation in which the second VTEP device encapsulates the reply packet to obtain the second VXLAN packet, refer to the implementation of generating the first VXLAN packet in the foregoing embodiment. Details are not described herein again. Therefore, the second VXLAN packet obtained by encapsulating the reply packet may also be referred to as a second PPP over VXLAN packet.

S303. The second VTEP device sends the second VXLAN packet to the first VTEP device by using the first VXLAN tunnel.

After obtaining the second VXLAN packet, the second VTEP device sends the second VXLAN packet to the first VTEP device by using the first VXLAN tunnel.

S304. The first VTEP device receives the second VXLAN packet from the second VTEP device by using the first VXLAN tunnel.

S305. The first VTEP device determines, based on the second VXLAN packet, that the first VXLAN tunnel is connected.

After receiving the second VXLAN packet, the first VTEP device decapsulates the second VXLAN packet to obtain the reply packet. For an implementation in which the first VTEP device decapsulates the second VXLAN packet, refer to the implementation of decapsulating the first VXLAN packet in the foregoing embodiment. Details are not described herein again. The first VTEP device determines connectivity of the first VXLAN tunnel based on the reply packet. Specifically, if the reply packet is the reply packet of the first echo packet, the first VTEP device determines the connectivity of the first VXLAN tunnel as normal. If the reply packet is not the reply packet of the first echo packet or the first VTEP device cannot receive the reply packet of the first echo packet within a predetermined period, the first VTEP device determines the connectivity of the first VXLAN tunnel as faulty. When determining the connectivity of the first VXLAN tunnel as faulty, the first VTEP device sets a status of the first VXLAN tunnel to down, and switches data traffic from the first VXLAN tunnel to a secondary VXLAN tunnel.

In some embodiments, the first VTEP device may periodically send, to the second VTEP device at an interval of predetermined duration, the first VXLAN packet that carries the first echo packet. When the first VTEP device cannot receive a corresponding reply packet within a predetermined period, the first VTEP device determines the connectivity of the first VXLAN tunnel as faulty, to implement the VXLAN tunnel keepalive detection mechanism.

In the foregoing implementation, the VXLAN tunnel connectivity and keepalive detection mechanism may be implemented. Further, a data flow that is based on a VXLAN tunnel is bidirectional, and a connectivity fault may be caused by a VTEP device. Therefore, the second VTEP device may also serve as a sender of an echo packet, to implement a connectivity and keepalive detection mechanism for the first VXLAN tunnel between the second VTEP device and the first VTEP device.

In the prior art, in terms of router entry synchronization, when a VXLAN is applied to a control plane, VTEP devices at both ends of a VXLAN tunnel have no simple and easy manner to obtain MAC addresses of the VTEP devices from each other. Usually, the VTEP devices at both ends of the VXLAN tunnel implement router entry synchronization in a static configuration manner or based on the BGP EVPN protocol. The static configuration manner is that a controller delivers synchronously-updated router entry information to the VTEP devices at both ends, and the implementation based on the BGP EVPN protocol is similar to the foregoing manner of establishing the VXLAN tunnel by using the BGP EVPN protocol. However, in the static configuration manner, it is difficult to ensure a correct and timely update. In the implementation that is based on the BGP EVPN protocol, because the BGP EVPN protocol is run independent of the VXLAN protocol, management costs are increased. Further, because the BGP EVPN protocol is relatively complex, implementation complexity is increased, especially for a small or medium network topology structure in which a simple network protocol is expected to be used as a basis. In addition, route synchronization learning that is based on the BGP EVPN protocol requires that the VTEP devices at both ends add MAC address information of the VTEP devices to routing information each time the routing information is transmitted, and consequently more network resources are occupied.

Figure 6A:
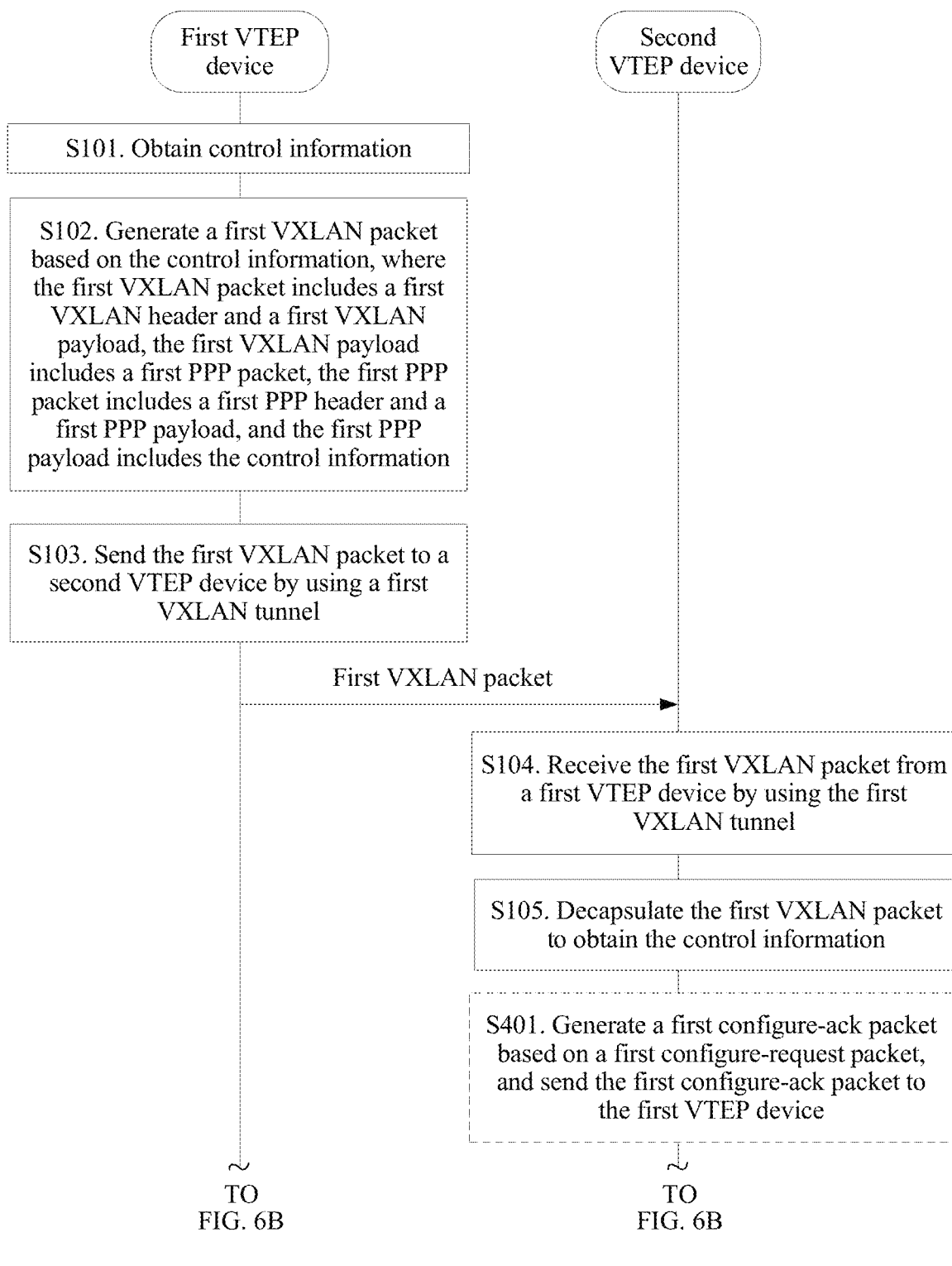
FIG. 6A, FIG. 6B, and FIG. 6C are a flowchart of still another packet processing method according to an embodiment of the present invention.
Figure 6B:
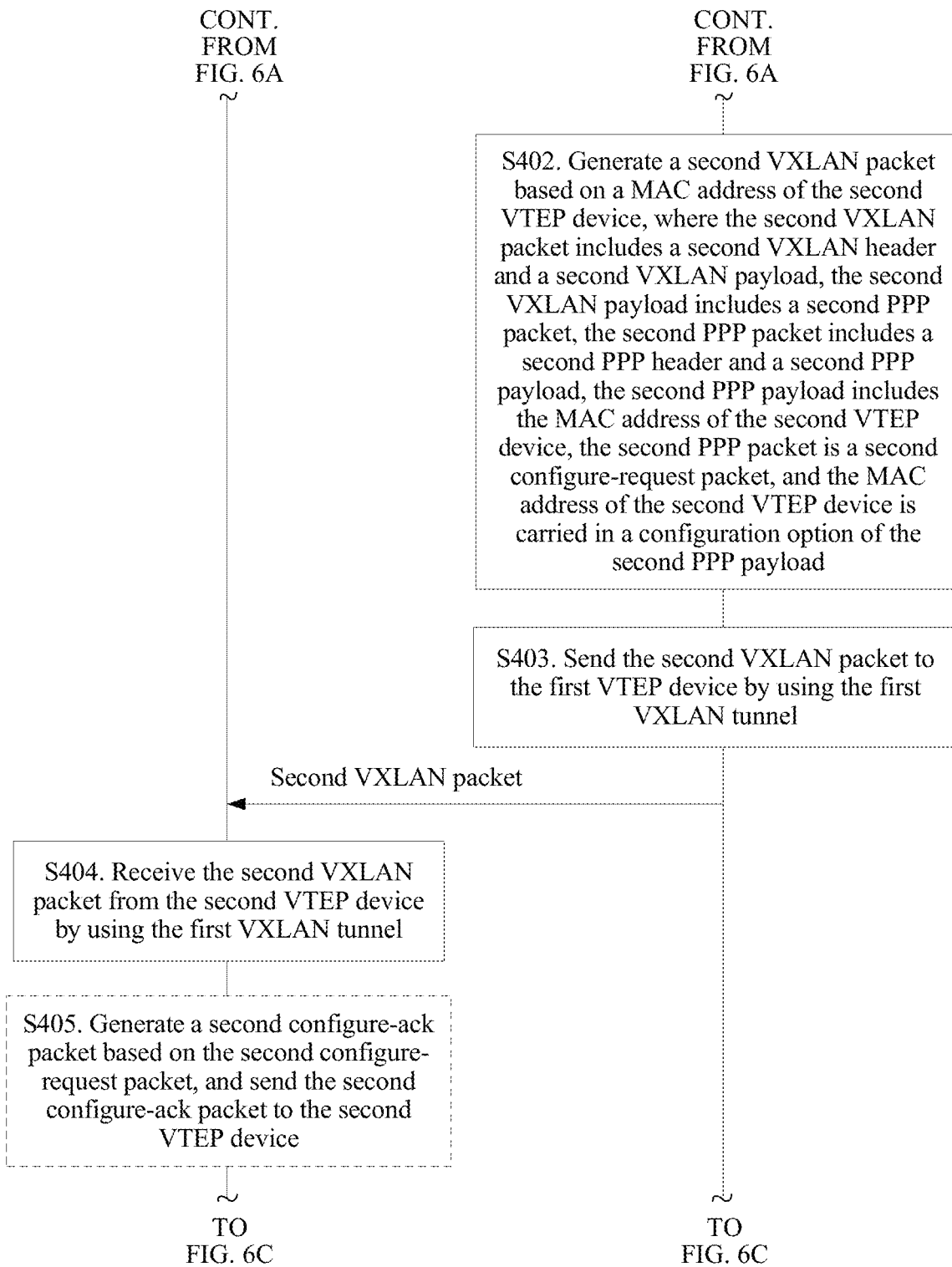
Figure 6C:
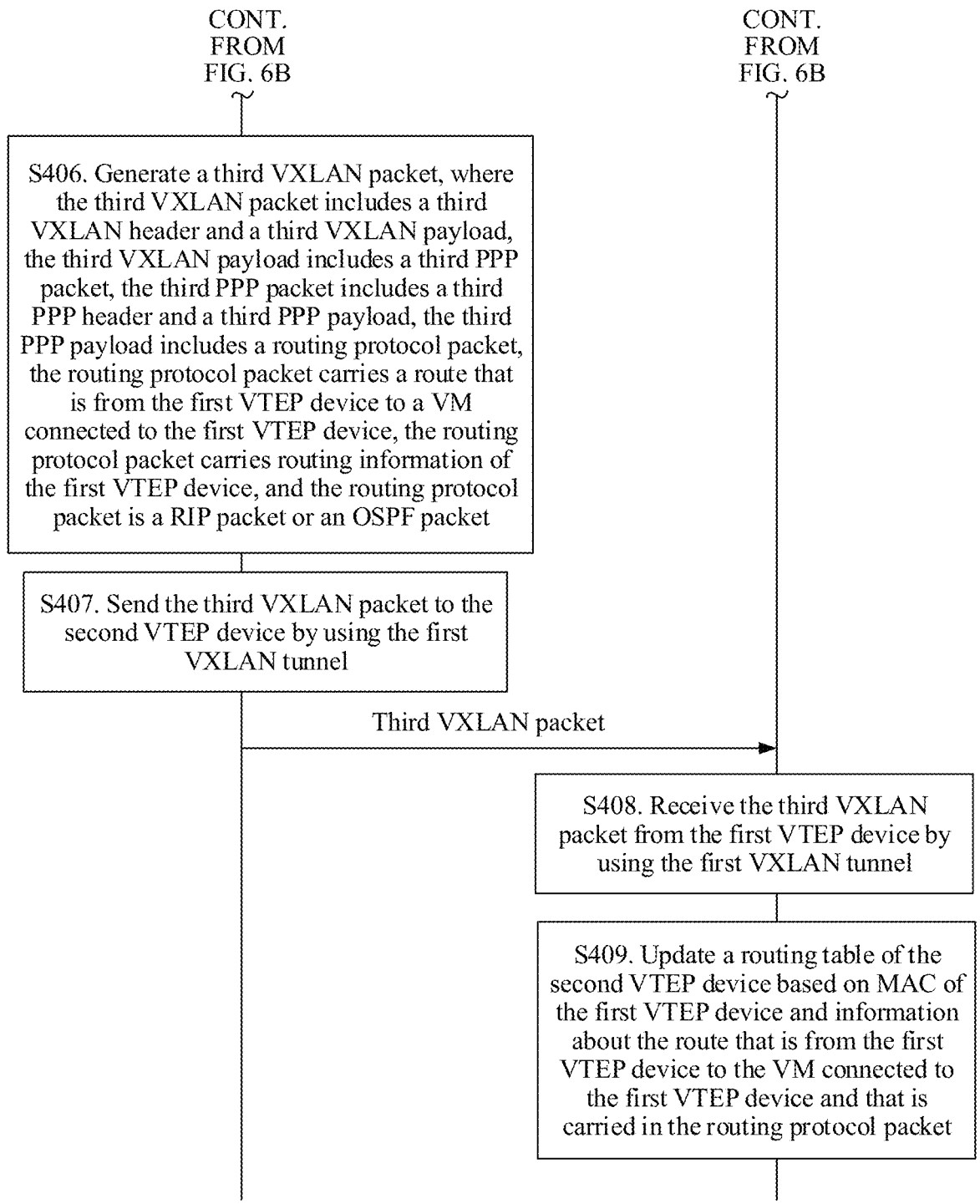

Based on the foregoing problem, in some embodiments, FIG. 6A, FIG. 6B, and FIG. 6C show a packet processing method for implementing a dynamic VXLAN-tunnel-based route learning mechanism by using the packet processing method shown in FIG. 2. For an implementation process of steps S101 to S105 in the method shown in FIG. 6A, FIG. 6B, and FIG. 6C, refer to the corresponding descriptions in FIG. 2 in the foregoing embodiment. When performing dynamic route learning, the first VTEP device and the second VTEP device need to learn of MAC addresses of the VTEP devices from each other. For example, the second VTEP device dynamically learns a route of the first VTEP device. The route of the first VTEP device is a route from the first VTEP device to a VM connected to the first VTEP device. When the second VTEP device receives routing information from the first VTEP device, the second VTEP device needs to use the MAC address of the first VTEP device as a mapping identifier of the to-be-learned routing information, update the routing information and the MAC address together to a routing table of the second VTEP device, and generate a corresponding forwarding table. The forwarding table is used to ensure that data traffic from a VM connected to the second VTEP device can be forwarded to the VM connected to the first VTEP device. Therefore, when dynamically learning the routing information of the first VTEP device, the second VTEP device needs to learn of the MAC address of the first VTEP device. In the same manner, the first VTEP device may also dynamically learn a route of the second VTEP device. The route of the second VTEP device is a route from the second VTEP device to a VM connected to the second VTEP device. Therefore, when dynamically learning routing information of the second VTEP device, the first VTEP device also needs to learn of the MAC address of the second VTEP device. Different from the route synchronization learning implementation that is based on the BGP EVPN protocol, in this implementation, each packet that includes the routing information and that is sent by the first VTEP device to the second VTEP device does not need to carry the MAC address of the first VTEP device, and each packet that includes the routing information and that is sent by the second VTEP device to the first VTEP device does not need to carry the MAC address of the second VTEP device. Instead, the MAC addresses of the VTEP devices are mutually negotiated by the first VTEP device and the second VTEP device before route synchronization learning is performed. Therefore, provided that the MAC addresses of the VTEP devices are mutually negotiated once, subsequent dynamic address learning and corresponding data traffic forwarding can be guided. In S101, the control information includes the MAC address of the first VTEP device. The MAC address of the first VTEP device is carried in a configuration option of the first PPP payload. The first PPP packet is a first configure-request packet. In a possible implementation, the MAC address of the first VTEP device is a device MAC address of the first VTEP device. The device MAC address of the first VTEP device may be specified by a device manufacturer when the first VTEP device is delivered. In some embodiments, the device manufacturer may configure a plurality of device MAC addresses for the first VTEP device for selection by a device user. In another possible implementation, when a function of the first VTEP device is implemented by a server in which the VM is located, the MAC address of the first VTEP device is a MAC address of the server. In still another possible implementation, alternatively, a virtual MAC address may be configured as the MAC address of the first VTEP device.

Specifically, the method shown in FIG. 6A, FIG. 6B, and FIG. 6C further includes the following steps.

S401. The second VTEP device generates a first configure-ack packet based on the first configure-request packet, and sends the first configure-ack packet to the first VTEP device.

After obtaining the first configure-request packet, the second VTEP device learns the MAC address of the first VTEP device that is carried in the configuration option of the first configure-request packet. In addition, the second VTEP device determines that the second VTEP device accepts the configuration option carried in the first configure-request packet, generates the first configure-ack packet, and sends the first configure-ack packet to the first VTEP device. The second VTEP device adds the MAC address of the first VTEP device to a configuration option of the first configure-ack packet, to indicate that the second VTEP accepts the configuration option carried in the first configure-request packet. An implementation in which the second VTEP device sends the first configure-ack packet to the first VTEP device is specifically as follows: The second VTEP device encapsulates the first configure-ack packet into a VXLAN packet that is also referred to as a PPP over VXLAN packet. The first configure-ack packet is a PPP packet. Then, the VXLAN packet that carries the first configure-ack packet is sent to the first VTEP device by using the first VXLAN tunnel. For an implementation in which the second VTEP device encapsulates the first configure-ack packet and sends the VXLAN packet, refer to the implementation of generating and sending the first VXLAN packet in the foregoing embodiment. Details are not described herein again.

A configuration option negotiation function defined in the PPP is implemented in a process in which the second VTEP device generates and sends the first configure-ack packet. After receiving the first configure-ack packet, the first VTEP device no longer needs to perform processing on the first configure-ack packet. In some embodiments, the second VTEP device may not perform step S401. To be specific, after receiving the first configure-request packet, the second VTEP device learns only the MAC address of the first VTEP device, and does not perform the step of generating and sending the first configure-ack packet. This manner may be implemented by extending the PPP.

S402. The second VTEP device generates a second VXLAN packet based on a MAC address of the second VTEP device, where the second VXLAN packet includes a second VXLAN header and a second VXLAN payload, the second VXLAN payload includes a second PPP packet, the second PPP packet includes a second PPP header and a second PPP payload, the second PPP payload includes the MAC address of the second VTEP device, the second PPP packet is a second configure-request packet, and the MAC address of the second VTEP device is carried in a configuration option of the second PPP payload.

The second VTEP device not only learns the MAC address of the first VTEP device based on the first configure-request packet sent by the first VTEP device, but also sends, to the first VTEP device, the second configure-request packet that carries the MAC address of the second VTEP device. The first VTEP device learns the MAC address of the second VTEP device based on the second configure-request packet sent by the second VTEP device. Specifically, for an implementation in which the second VTEP device encapsulates the MAC address of the second VTEP device to obtain the second VXLAN packet, refer to the implementation of generating the first VXLAN packet in the foregoing embodiment. Details are not described herein again.

S403. The second VTEP device sends the second VXLAN packet to the first VTEP device by using the first VXLAN tunnel.

S404. The first VTEP device receives the second VXLAN packet from the second VTEP device by using the first VXLAN tunnel.

The second VTEP device sends the second VXLAN packet to the first VTEP device by using the first VXLAN tunnel, and the first VTEP device receives the second VXLAN packet, to obtain the MAC address of the second VTEP device. In this way, the first VTEP device learns the MAC address of the second VTEP device.

S405. The first VTEP device generates a second configure-ack packet based on the second configure-request packet, and sends the second configure-ack packet to the second VTEP device.

After obtaining the second configure-request packet, the first VTEP device learns the MAC address, carried in the configuration option of the second configure-request packet, of the second VTEP device. In addition, the first VTEP device determines that the first VTEP device accepts the configuration option carried in the second configure-request packet, generates the second configure-ack packet, and sends the second configure-ack packet to the second VTEP device. The first VTEP device adds the MAC address of the second VTEP device to a configuration option of the second configure-ack packet, to indicate that the first VTEP accepts the configuration option carried in the second configure-request packet. An implementation in which the first VTEP device sends the second configure-ack packet to the second VTEP device is specifically as follows: The first VTEP device encapsulates the second configure-ack packet into a VXLAN packet that is also referred to as a PPP over VXLAN packet. The second configure-ack packet is a PPP packet. Then, the VXLAN packet that carries the second configure-ack packet is sent to the second VTEP device by using the first VXLAN tunnel. For an implementation in which the first VTEP device encapsulates the second configure-ack packet and sends the VXLAN packet, refer to the implementation of generating and sending the first VXLAN packet in the foregoing embodiment. Details are not described herein again.

A configuration option negotiation function defined in the PPP is implemented in a process in which the first VTEP device generates and sends the second configure-ack packet.

After receiving the second configure-ack packet, the second VTEP device no longer needs to perform processing on the second configure-ack packet. In some embodiments, the first VTEP device may not perform step S405. To be specific, after receiving the second configure-request packet, the first VTEP device learns only the MAC address of the second VTEP device, and does not perform the step of generating and sending the second configure-ack packet. This manner may be implemented by extending the PPP.

In the foregoing implementation, the MAC addresses of the VTEP devices at both ends of the VXLAN tunnel may be negotiated based on the VXLAN packet, so that the VTEP devices at both ends of the VXLAN tunnel mutually learn the MAC addresses of the VTEP devices. Compared with the route synchronization learning implementation that is based on the BGP EVPN protocol, complexity of negotiating the MAC addresses of the VTEP devices is reduced, and the following problem is resolved: The route synchronization learning that is based on the BGP EVPN protocol requires that each piece of routing information transmitted by the VTEP devices at both ends carries MAC address information of the VTEP devices, and consequently more network resources are occupied.

Further, the method shown in FIG. 6A, FIG. 6B, and FIG. 6C further includes the following steps.

S406. The first VTEP device generates a third VXLAN packet, where the third VXLAN packet includes a third VXLAN header and a third VXLAN payload, the third VXLAN payload includes a third PPP packet, the third PPP packet includes a third PPP header and a third PPP payload, the third PPP payload includes a routing protocol packet, the routing protocol packet carries a route that is from the first VTEP device to a VM connected to the first VTEP device, and the routing protocol packet is a Routing Information Protocol (RIP) packet or an Open Shortest Path First (OSPF) packet.

Figure 10:
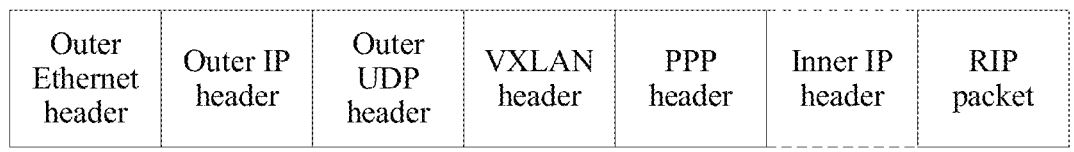
FIG. 10 is a schematic encapsulation diagram of still another VXLAN packet according to an embodiment of the present invention.
Figure 11:
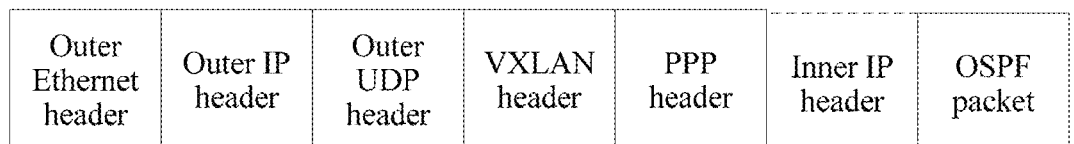
FIG. 11 is a schematic encapsulation diagram of still another VXLAN packet according to an embodiment of the present invention.

After the first VTEP device and the second VTEP device mutually negotiate the MAC addresses of the VTEP devices, the first VTEP device generates the third VXLAN packet that carries the routing protocol packet. Specifically, for an implementation in which the first VTEP device encapsulates the routing protocol packet to obtain the third VXLAN packet, refer to the implementation of generating the first VXLAN packet in the foregoing embodiment. Details are not described herein again. The third VXLAN packet may also be referred to as a third PPP over VXLAN packet. The routing protocol packet carries the route that is from the first VTEP device to the VM connected to the first VTEP device, so that the second VTEP device can update the routing table of the second VTEP device based on the routing information, to synchronize the routing information from the first VTEP device to the second VTEP device. The second VTEP device generates the corresponding forwarding table based on the routing table of the second VTEP device. The forwarding table is used to ensure that the data traffic from the VM connected to the second VTEP device can be forwarded to the VM connected to the first VTEP device. Specifically, the routing protocol packet is a RIP packet or an OSPF packet, and the RIP packet or the OSPF packet carries information about the route that is from the first VTEP device to the VM connected to the first VTEP device, as shown in FIG. 10 and FIG. 11. An implementation process of encapsulating the routing information of the first VTEP device by using the RIP packet or the OSPF packet complies with the RIP or the OSPF protocol. Details are not described herein.

In addition, when the third VXLAN packet carries the routing protocol packet in a PPP over VXLAN packet format, the third VXLAN packet includes a routing protocol packet identifier, and the routing protocol packet identifier is used to indicate that the third VXLAN packet carries the routing protocol packet. Specifically, an example in which the routing protocol packet is a RIP packet or an OSPF packet is used for description, as shown in FIG. 10 and FIG. 11.

In a possible implementation, when the third VXLAN packet carries the RIP packet or the OSPF packet in the PPP over VXLAN packet format, a value of a protocol field in the PPP header in the third VXLAN packet is, for example, 0x0021, used to identify that a packet following the PPP header is an IP packet, where "0x" indicates a hexadecimal value. Further, when the RIP packet is used, an inner IP header is further included between the PPP header and the RIP packet in the third VXLAN packet. A protocol field in the inner IP header is used to indicate that a packet following the inner IP header is a RIP packet. When the OSPF packet is used, an inner IP header is further included between the PPP header and the OSPF packet in the third VXLAN packet. A protocol field in the inner IP header is used to indicate that a packet following the inner IP header is an OSPF packet. In this way, a beneficial effect is that there is no need to change the existing PPP, thereby improving compatibility.

In another possible implementation, when the third VXLAN packet carries the RIP packet or the OSPF packet in the PPP over VXLAN packet format, an inner IP header does not need to be added, but a reserved value of a protocol field specified in the PPP is used to extend definition of a protocol field in the PPP header in the third VXLAN packet, to indicate that a packet following the PPP header is a RIP packet or an OSPF packet. For example, when the RIP packet is used, a value of the protocol field in the PPP header in the third VXLAN packet is extended. For example, the value is set to 0x8001 to indicate that the packet following the PPP header is a RIP packet. When the RIP packet is used, a value of the protocol field in the PPP header in the third VXLAN packet is extended. For example, the value is set to 0x8002 to indicate that the packet following the PPP header is an OSPF packet. In this way, a beneficial effect is that a length of a packet is reduced, thereby reducing network resources occupied for transmitting the packet.

S407. The first VTEP device sends the third VXLAN packet to the second VTEP device by using the first VXLAN tunnel.

After encapsulating, into the third VXLAN packet, the information about the route from the first VTEP device to the VM connected to the first VTEP device, the first VTEP device sends the third VXLAN packet to the second VTEP device.

S408. The second VTEP device receives the third VXLAN packet from the first VTEP device by using the first VXLAN tunnel.

S409. The second VTEP device updates a routing table of the second VTEP device based on MAC of the first VTEP device and information about the route that is from the first VTEP device to the VM connected to the first VTEP device and that is carried in the routing protocol packet.

After receiving the third VXLAN packet, the second VTEP device decapsulates the third VXLAN packet to obtain the routing protocol packet that carries the routing information of the first VTEP device. For an implementation in which the second VTEP device decapsulates the third VXLAN packet, refer to the implementation of decapsulating the first VXLAN packet in the foregoing embodiment. Details are not described herein again. The second VTEP device updates the routing table of the second VTEP device based on the routing information of the first VTEP device and the MAC of the first VTEP device, to synchronize the routing information from the first VTEP device to the second VTEP device. Specifically, the routing protocol packet is a RIP packet or an OSPF packet, and the RIP packet or the OSPF packet carries the routing information of the first VTEP device. An implementation process in which the second VTEP device learns the routing information of the first VTEP device based on the RIP packet or the OSPF packet complies with the RIP or the OSPF protocol. Details are not described herein.

In the foregoing implementation, a dynamic route synchronization learning mechanism may be implemented in a manner in which the VXLAN packet carries the routing protocol packet. Compared with the route synchronization learning implementation that is based on the BGP EVPN protocol, complexity of dynamic route synchronization learning is reduced. Based on the same implementation process, the second VTEP device may also issue, to the first VTEP device, information about the route from the second VTEP device to the VM connected to the second VTEP device, to synchronize the routing information from the second VTEP device to the first VTEP device.

Figure 7A:
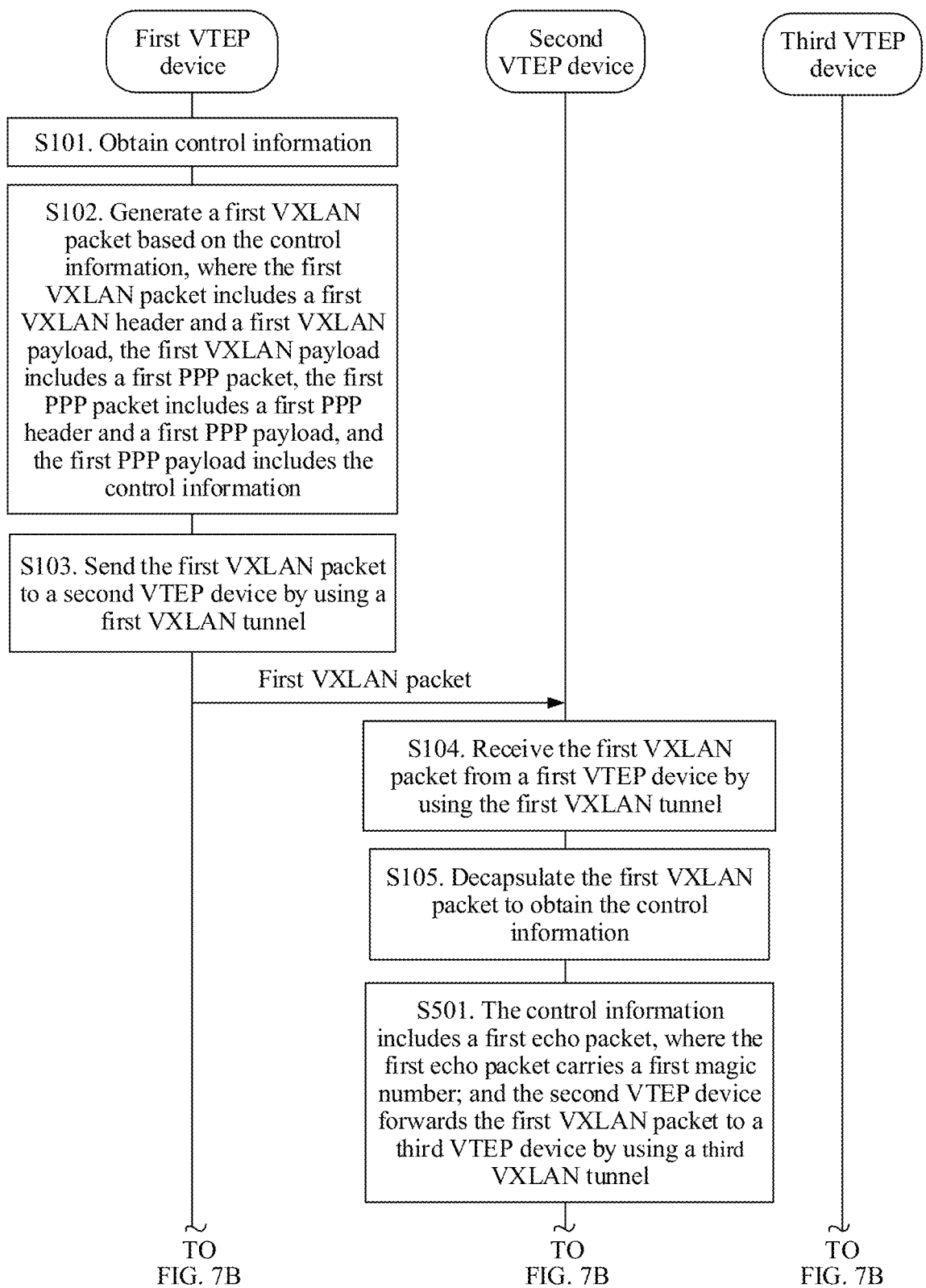
FIG. 7A and FIG. 7B are a flowchart of still another packet processing method according to an embodiment of the present invention.
Figure 7B:
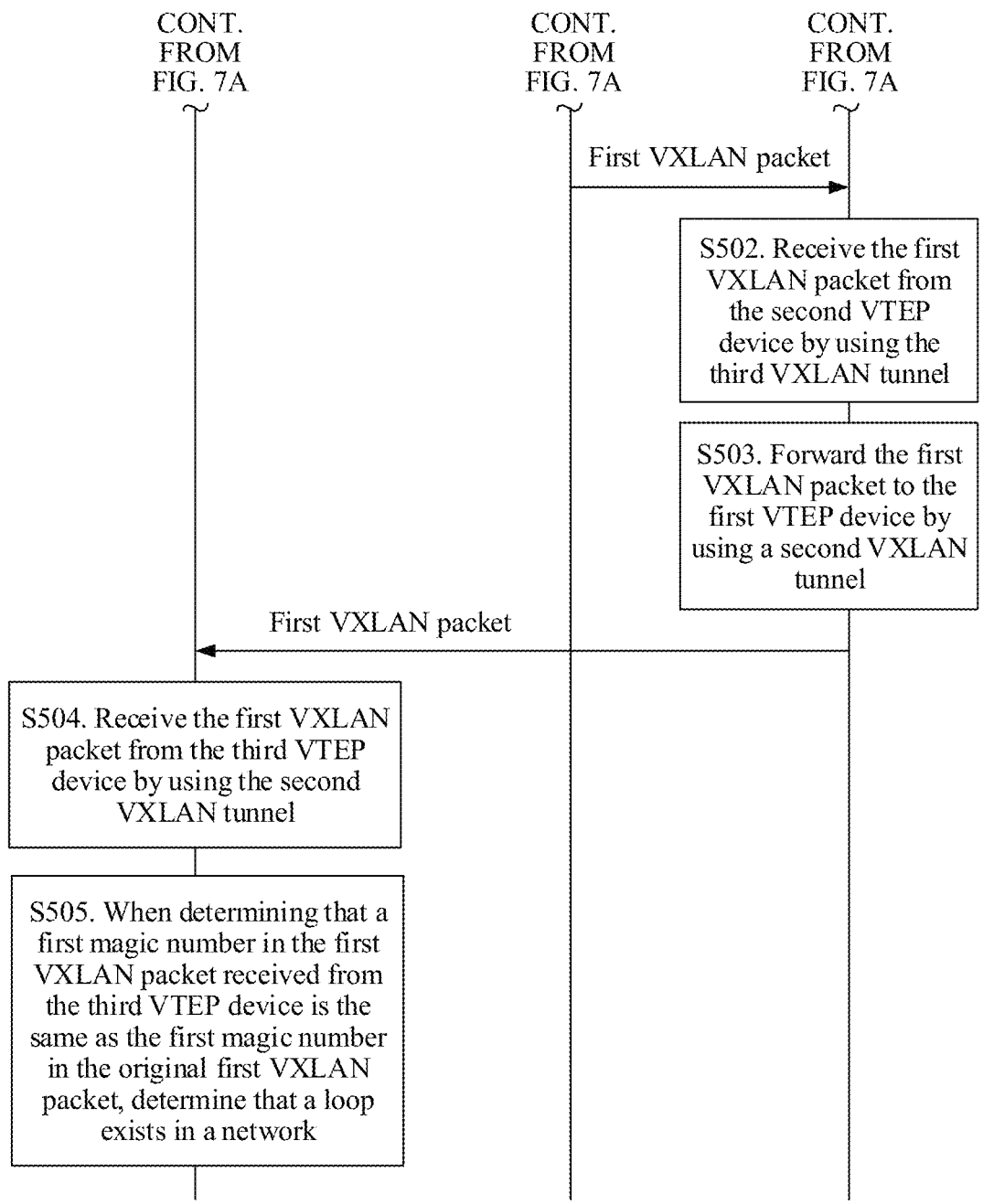

In some embodiments, FIG. 7A and FIG. 7B show a packet processing method for implementing a loop detection mechanism that is based on a VXLAN tunnel by using the packet processing method shown in FIG. 2. Usually, in a VXLAN network, VXLAN tunnels are isolated from each other. Therefore, there is no loop. However, in some special scenarios, the VXLAN tunnels need to be interconnected. Therefore, the method shown in FIG. 7A and FIG. 7B shows a method for implementing loop detection in a scenario in which VXLAN tunnels need to be interconnected. A loop scenario is illustrated in this embodiment to describe the method shown in FIG. 7A and FIG. 7B. The loop scenario includes a first VTEP device, a second VTEP device, and a third VTEP device. The first VTEP device and the second VTEP device are connected by using a first VXLAN tunnel. The second VTEP device and the third VTEP device are connected by using a third VXLAN tunnel. The third VTEP device and the first VTEP device are connected by using a second VXLAN tunnel. It should be understood that in an actual loop scenario, a loop including more than three VTEP devices may be included.

For an implementation process of steps S101 to S105 in the method shown in FIG. 7A and FIG. 7B, refer to the corresponding descriptions in FIG. 2 in the foregoing embodiment. In S101, the control information includes a first echo packet, the first echo packet is for implementing a loop detection function defined in the PPP, and the first echo packet carries a first magic number. The first magic number is randomly generated by the first VTEP device, and is used to uniquely identify that the echo packet in which the magic number is located is sent by the first VTEP device. Specifically, the magic number may be generated based on a device serial number or a MAC address of the first VTEP device. In addition, the control information further includes a code field. A value in the code field may be used to identify that the control information includes the first echo packet.

In some embodiments, the first echo packet may be generated by the first PPP processing module in the first VTEP device.

Specifically, the method shown in FIG. 7A and FIG. 7B further includes the following steps.

S501. The second VTEP device forwards the first VXLAN packet to a third VTEP device by using a third VXLAN tunnel.

After the second VTEP device receives the first VXLAN packet from the first VTEP device, and the second VTEP device decapsulates the first VXLAN packet to obtain the first echo packet, the second VTEP device determines that the obtained packet is the first echo packet, and further performs the following operations when determining that the first echo packet carries the first magic number: The second VTEP device generates a reply packet of the first echo packet by using the implementation of the foregoing embodiment, adds a magic number of the second VTEP device to the reply packet, then encapsulates the reply packet into a PPP over VXLAN packet, and sends the PPP over VXLAN packet to the first VTEP device. In addition, the second VTEP device re-encapsulates the first echo packet into the first VXLAN packet, and forwards the first VXLAN packet by using another VXLAN tunnel. The another VXLAN tunnel is a VXLAN tunnel that is connected to the second VTEP device and that is different from the VXLAN tunnel through which the second VTEP device receives the first VXLAN packet. In this embodiment, the another VXLAN tunnel is a VXLAN tunnel, for example, the third VXLAN tunnel, that is connected to the second VTEP device and that is different from the first VXLAN tunnel.

S502. The third VTEP device receives the first VXLAN packet from the second VTEP device by using the third VXLAN tunnel.

S503. The third VTEP device forwards the first VXLAN packet to the first VTEP device by using a second VXLAN tunnel.

Specifically, after receiving the first VXLAN packet, the third VTEP device processes the received first VXLAN packet in the same manner in which the second VTEP device processes the first VXLAN packet. After the third VTEP device obtains the first echo packet and determines that the first echo packet carries the first magic number, the third VTEP device generates a reply packet of the first echo packet by using the implementation of the foregoing embodiment, adds a magic number of the third VTEP device to the reply packet, then encapsulates the reply packet into a PPP over VXLAN packet, and sends the PPP over VXLAN packet to the second VTEP device. In addition, the third VTEP device re-encapsulates the first echo packet into the first VXLAN packet, and forwards the first VXLAN packet by using another VXLAN tunnel. The another VXLAN tunnel is a VXLAN tunnel that is connected to the third VTEP device and that is different from the VXLAN tunnel through which the third VTEP device receives the first VXLAN packet. In this embodiment, the another VXLAN tunnel is a VXLAN tunnel, for example, the second VXLAN tunnel, that is connected to the third VTEP device and that is different from the third VXLAN tunnel.

S504. The first VTEP device receives the first VXLAN packet from the third VTEP device by using the second VXLAN tunnel.

S505. When determining that a first magic number in the first VXLAN packet received from the third VTEP device is the same as the first magic number in the original first VXLAN packet, the first VTEP device determines that a loop exists in a network.

After receiving the first VXLAN packet from the third VTEP device, the first VTEP device decapsulates, by using the foregoing implementation, the first VXLAN packet received from the third VTEP device, to obtain the first echo packet, and determines the first magic number in the first echo packet. The first VTEP device determines that the first magic number in the first VXLAN packet received from the third VTEP device is the same as the first magic number in the original first VXLAN packet that is previously sent, to determine that a loop exists in the network.

In the foregoing process in this implementation, a method for detecting that a loop exists in the network is shown by using a process of transmitting the first VXLAN packet in a loop including the first VTEP device, the second VTEP device, and the third VTEP device. In an actual scenario, after sending the first VXLAN packet, the first VTEP device does not know whether the first VXLAN packet is returned or which VTEP devices and corresponding tunnels the first VXLAN packet passes through. It is assumed that after sending the first VXLAN packet, the first VTEP device performs the following steps:

S504'. The first VTEP device receives a second VXLAN packet from a third VTEP device by using a second VXLAN tunnel, where the second VXLAN packet includes a second VXLAN header and a second VXLAN payload, the second VXLAN payload includes a second PPP packet, the second PPP packet includes a second PPP header and a second PPP payload, the second PPP payload includes a second echo packet, and the second echo packet carries a second magic number.

S505'. When determining that a value of the first magic number is equal to a value of the second magic number, the first VTEP device determines that the first VXLAN tunnel, the second VXLAN tunnel, and a third VXLAN tunnel form a loop, where a VXLAN tunnel between the second VTEP device and the third VTEP device is the third VXLAN tunnel.

In the foregoing implementation, loop detection in the VXLAN network may be implemented based on the VXLAN packet, to help a network administrator discover in time a loop existing in the VXLAN network.

Figure 13:
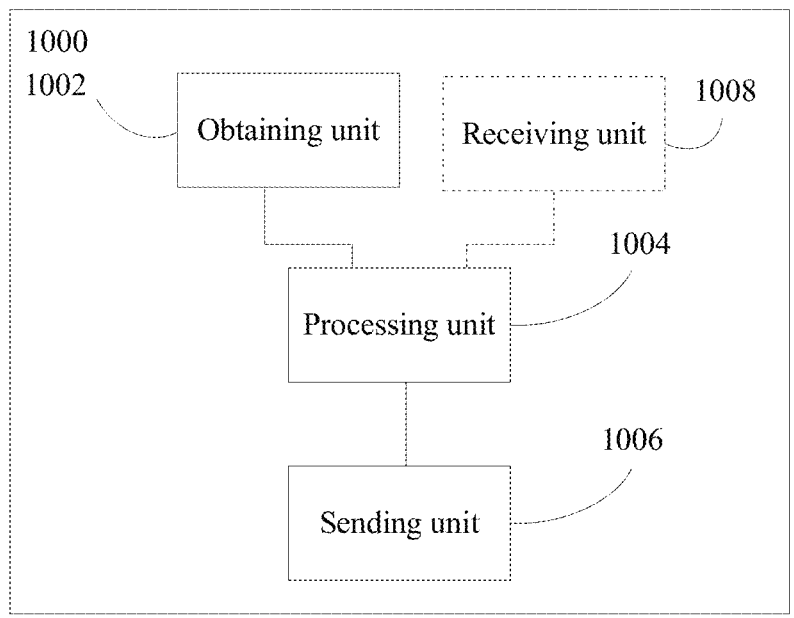
FIG. 13 is a schematic structural diagram of a first VTEP device according to an embodiment of the present application.

FIG. 13 is a schematic structural diagram of a first VTEP device 1000 according to an embodiment of the present application. The first VTEP device shown in FIG. 13 may perform corresponding steps performed by the first VTEP device in the methods of the foregoing embodiments. As shown in FIG. 13, the first VTEP device 1000 includes an obtaining unit 1002, a processing unit 1004, and a sending unit 1006.

The obtaining unit 1002 is configured to obtain control information. The control information is for implementing a function defined in PPP.

The processing unit 1004 is configured to generate a first VXLAN packet based on the control information. The first VXLAN packet includes a first VXLAN header and a first VXLAN payload, the first VXLAN payload includes a first PPP packet, the first PPP packet includes a first PPP header and a first PPP payload, and the first PPP payload includes the control information.

The sending unit 1006 is configured to send the first VXLAN packet to a second VTEP device by using a first VXLAN tunnel.

In some embodiments, the first VTEP device is configured to implement an authentication function defined in the PPP. The control information includes authentication request information, and the authentication request information is for implementing the authentication function defined in the PPP. The first VTEP device further includes a receiving unit 1008.

The receiving unit 1008 is configured to receive a second VXLAN packet from the second VTEP device by using the first VXLAN tunnel after the sending unit 1006 sends the first VXLAN packet to the second VTEP device by using the first VXLAN tunnel. The second VXLAN packet includes a second VXLAN header and a second VXLAN payload, the second VXLAN payload includes a second PPP packet, the second PPP packet includes a second PPP header and a second PPP payload, and the second PPP payload includes authentication response information of the authentication request information.

The processing unit 1004 is further configured to determine, based on the authentication response information in the second VXLAN packet, that the first VTEP device has been authenticated by the second VTEP device according to the PPP or fails to be authenticated by the second VTEP device according to the PPP.

In a process in which the first VTEP device is configured to implement the authentication function defined in the PPP, further, in some embodiments, the obtaining unit 1002 is specifically configured to: receive verification information from the second VTEP device, where the verification information includes a packet randomly generated by the second VTEP device; and obtain the authentication request information, where the authentication request information includes the packet randomly generated by the second VTEP device.

In some embodiments, the first VTEP device is configured to implement a connectivity detection function defined in the PPP. The control information includes a first echo packet, and the first echo packet is for implementing the connectivity detection function defined in the PPP. The first VTEP device further includes a receiving unit 1008.

The receiving unit 1008 is configured to receive a second VXLAN packet from the second VTEP device by using the first VXLAN tunnel after the sending unit 1006 sends the first VXLAN packet to the second VTEP device by using the first VXLAN tunnel. The second VXLAN packet includes a second VXLAN header and a second VXLAN payload, the second VXLAN payload includes a second PPP packet, the second PPP packet includes a second PPP header and a second PPP payload, and the second PPP payload includes a reply packet of the first echo packet.

The processing unit 1004 is further configured to determine, based on the second VXLAN packet, that the first VXLAN tunnel is connected.

In some embodiments, the first VTEP device is configured to implement a configuration option negotiation function defined in the PPP. The control information includes a MAC address of the first VTEP device, the MAC address of the first VTEP device is carried in a configuration option of the first PPP payload, and the first PPP packet is a first configure-request packet. The first VTEP device further includes a receiving unit 1008.

The receiving unit 1008 is configured to receive a second VXLAN packet from the second VTEP device by using the first VXLAN tunnel after the sending unit 1006 sends the first VXLAN packet to the second VTEP device by using the first VXLAN tunnel. The second VXLAN packet includes a second VXLAN header and a second VXLAN payload, the second VXLAN payload includes a second PPP packet, the second PPP packet includes a second PPP header and a second PPP payload, the second PPP payload includes a MAC address of the second VTEP device, the second PPP packet is a second configure-request packet, and the MAC address of the second VTEP device is carried in a configuration option of the second PPP payload.

After the first VTEP device implements the configuration option negotiation function defined in the PPP, further, in some embodiments, the first VTEP device is configured to implement a route synchronization function. The first VTEP device includes:

The processing unit 1004 is further configured to generate a third VXLAN packet after the receiving unit 1008 receives the second VXLAN packet from the second VTEP device by using the first VXLAN tunnel. The third VXLAN packet includes a third VXLAN header and a third VXLAN payload, the third VXLAN payload includes a third PPP packet, the third PPP packet includes a third PPP header and a third PPP payload, the third PPP payload includes a routing protocol packet, the routing protocol packet carries a route that is from the first VTEP device to a VM connected to the first VTEP device, and the routing protocol packet is a RIP packet or an OSPF packet.

The sending unit 1006 is further configured to send the third VXLAN packet to the second VTEP device by using the first VXLAN tunnel.

In some embodiments, the first VTEP device is configured to implement a loop detection function defined in the PPP. The control information includes a first echo packet, the first echo packet is for implementing the loop detection function defined in the PPP, and the first echo packet carries a first magic number. The first VTEP device further includes a receiving unit 1008.

The receiving unit 1008 is configured to receive a second VXLAN packet from a third VTEP device by using a second VXLAN tunnel. The second VXLAN packet includes a second VXLAN header and a second VXLAN payload, the second VXLAN payload includes a second PPP packet, the second PPP packet includes a second PPP header and a second PPP payload, the second PPP payload includes a second echo packet, and the second echo packet carries a second magic number.

The processing unit 1004 is further configured to: when a value of the first magic number is equal to a value of the second magic number, determine that the first VXLAN tunnel, the second VXLAN tunnel, and a third VXLAN tunnel form a loop. A VXLAN tunnel between the second VTEP device and the third VTEP device is the third VXLAN tunnel.

The first VTEP device shown in FIG. 13 may perform the corresponding steps performed by the first VTEP device in the methods of the foregoing embodiments, to ensure that simple VXLAN control plane communication is implemented during use of a VXLAN control plane, and to help reduce overheads and complexity of implementing the VXLAN control plane.

Figure 14:
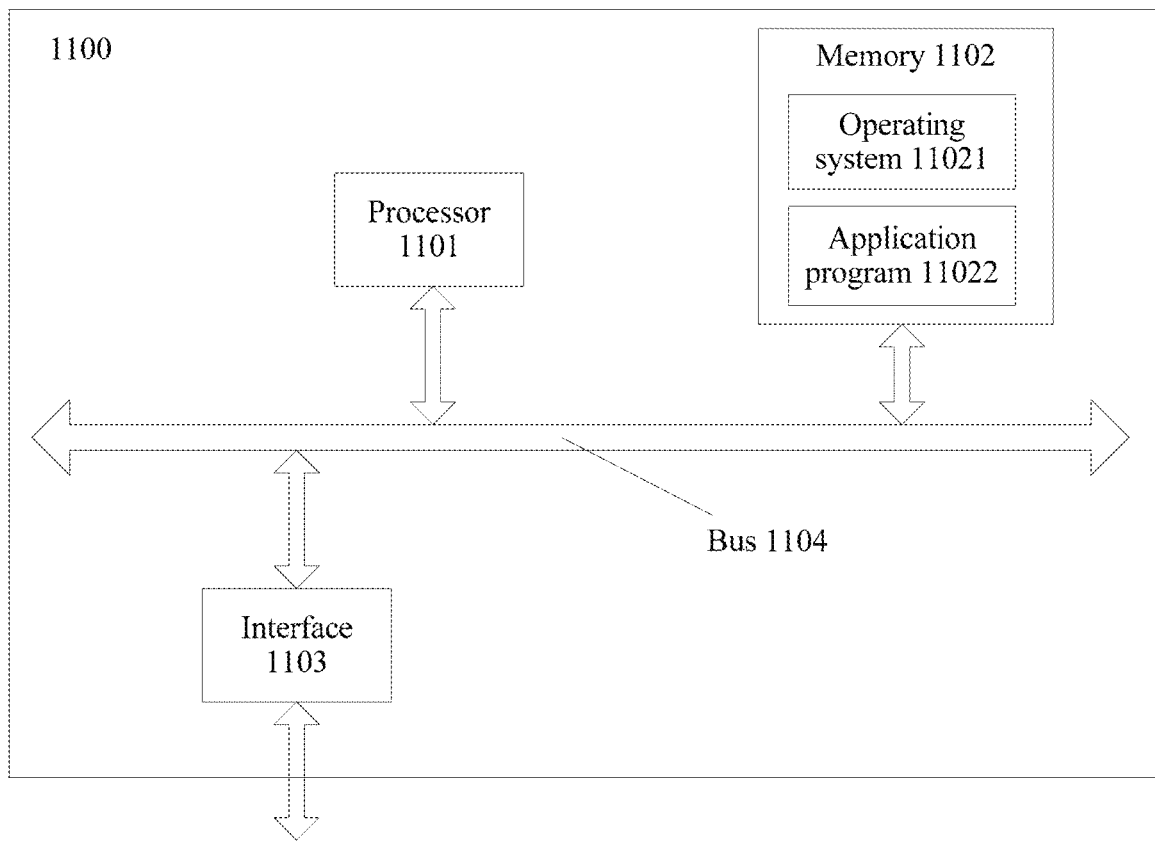
FIG. 14 is a schematic structural diagram of hardware of a first VTEP device according to an embodiment of the present application.

FIG. 14 is a schematic structural diagram of hardware of a first VTEP device 1100 according to an embodiment of the present application. The first VTEP device shown in FIG. 14 may perform corresponding steps performed by the first VTEP device in the methods of the foregoing embodiments.

As shown in FIG. 14, the first VTEP device 1100 includes a processor 1101, a memory 1102, an interface 1103, and a bus 1104. The interface 1103 may be implemented in a wireless or wired manner, and specifically, may be an element such as a network interface card. The processor 1101, the memory 1102, and the interface 1103 are connected by using the bus 1104.

The interface 1103 may specifically include a transmitter and a receiver and is configured to: transmit or receive information between the first VTEP device and the second VTEP device in the foregoing embodiments, or transmit or receive information between the first VTEP device and a VM connected to the first VTEP device. In addition, the interface 1103 may be further configured to transmit or receive information between the first VTEP device and a controller. For example, the interface 1103 is configured to support processes S101, S103, S205, S304, S404, S407, and S504 in FIG. 2 to FIG. 7A and FIG. 7B. The processor 1101 is configured to perform processing performed by the first VTEP device in the foregoing embodiments. For example, the processor 1101 is configured to: generate a VXLAN packet, and send the VXLAN packet to the second VTEP device by using the interface 1103. In some embodiments, the processor 1101 may be configured to: determine whether the first VTEP device has been authenticated by the second VTEP device according to PPP, determine connectivity of a first VXLAN tunnel, determine whether a loop exists in a network, and/or perform another process of the technology described in this specification. For example, the processor 1101 is configured to support processes S102, S206, S305, S405, S406, and S505 in FIG. 2 to FIG. 7A and FIG. 7B. In some embodiments, process S101 in FIG. 2 to FIG. 7A and FIG. 7B may be performed by the processor 1101. For example, the processor 1101 generates control information. The memory 1102 includes an operating system 11021 and an application program 11022, and is configured to store a program, code, or an instruction. When the processor or a hardware device executes the program, the code, or the instruction, a processing process related to the first VTEP device in FIG. 2 to FIG. 7A and FIG. 7B may be completed.

It may be understood that FIG. 14 shows merely a simplified design of the first VTEP device. During actual application, the first VTEP device may include any quantity of interfaces, processors, memories, or the like, and all first VTEP devices that may implement the present application fall within the protection scope of the present application.

In addition, an embodiment of the present application provides a computer storage medium, configured to store a computer software instruction used by the first VTEP device, and the computer software instruction includes a program designed to perform the embodiments shown in FIG. 2 to FIG. 7A and FIG. 7B.

Figure 15:
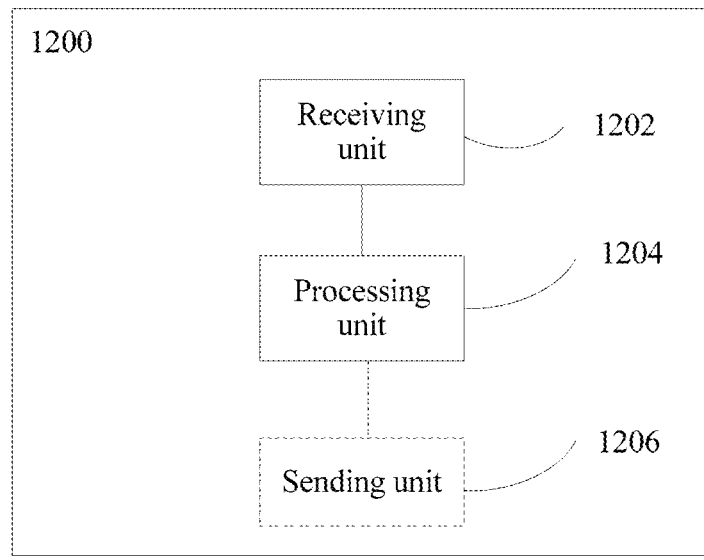
FIG. 15 is a schematic structural diagram of a second VTEP device according to an embodiment of the present application.

FIG. 15 is a schematic structural diagram of a second VTEP device 1200 according to an embodiment of the present application. The second VTEP device shown in FIG. 15 may perform corresponding steps performed by the second VTEP device in the methods of the foregoing embodiments. As shown in FIG. 15, the second VTEP device 1200 includes a receiving unit 1202 and a processing unit 1204.

The receiving unit 1202 is configured to receive a first VXLAN packet from a first VTEP device by using a first VXLAN tunnel. The first VXLAN packet includes a first VXLAN header and a first VXLAN payload, the first VXLAN payload includes a first PPP packet, the first PPP packet includes a first PPP header and a first PPP payload, the first PPP payload includes control information, and the control information is for implementing a function defined in PPP.

The processing unit 1204 is configured to decapsulate the first VXLAN packet to obtain the control information.

In some embodiments, the second VTEP device is configured to implement an authentication function defined in the PPP. The control information includes authentication request information, and the authentication request information is for implementing the authentication function defined in the PPP. The second VTEP device further includes a sending unit 1206.

The processing unit 1204 is further configured to determine authentication response information of the authentication request information based on the authentication request information after decapsulating the first VXLAN packet to obtain the control information.

The processing unit 1204 is further configured to generate a second VXLAN packet based on the authentication response information. The second VXLAN packet includes a second VXLAN header and a second VXLAN payload, the second VXLAN payload includes a second PPP packet, the second PPP packet includes a second PPP header and a second PPP payload, and the second PPP payload includes the authentication response information of the authentication request information.

The sending unit 1206 is configured to send the second VXLAN packet to the first VTEP device by using the first VXLAN tunnel.

The processing unit 1204 is further configured to determine, based on the authentication response information, that the first VTEP device has been authenticated by the second VTEP device according to the PPP or fails to be authenticated by the second VTEP device according to the PPP.

In a process in which the second VTEP device is configured to implement the authentication function defined in the PPP, further, in some embodiments, the second VTEP device includes:

The processing unit 1204 is further configured to generate verification information before the receiving unit 1202 receives the first VXLAN packet from the first VTEP device by using the first VXLAN tunnel. The verification information includes a random packet.

The sending unit 1206 is further configured to send the verification information to the first VTEP device, where the verification information is used by the first VTEP device to obtain the authentication request information based on the verification information.

In a process in which the second VTEP device is configured to implement the authentication function defined in the PPP, further, in some embodiments, the processing unit 1204 is specifically configured to:

when the second VTEP device determines, based on the authentication response information, that the first VTEP device has been authenticated by the second VTEP device according to the PPP, determine that a status of the first VXLAN tunnel is up; or when the second VTEP device determines, based on the authentication response information, that the first VTEP device fails to be authenticated by the second VTEP device according to the PPP, determine that a status of the first VXLAN tunnel is down.

In some embodiments, the second VTEP device is configured to implement a connectivity detection function defined in the PPP. The control information includes a first echo packet, and the first echo packet is for implementing the connectivity detection function defined in the PPP. The second VTEP device further includes a sending unit 1206.

The processing unit 1204 is further configured to determine a reply packet of the first echo packet based on the first echo packet after decapsulating the first VXLAN packet to obtain the control information.

The processing unit 1204 is further configured to generate a second VXLAN packet based on the reply packet. The second VXLAN packet includes a second VXLAN header and a second VXLAN payload, the second VXLAN payload includes a second PPP packet, the second PPP packet includes a second PPP header and a second PPP payload, and the second PPP payload includes the reply packet of the first echo packet.

The sending unit 1206 is configured to send the second VXLAN packet to the first VTEP device by using the first VXLAN tunnel.

In some embodiments, the second VTEP device is configured to implement a configuration option negotiation function defined in the PPP. The control information includes a MAC address of the first VTEP device, the MAC address of the first VTEP device is carried in a configuration option of the first PPP payload, and the first PPP packet is a first configure-request packet. The second VTEP device further includes a sending unit 1206.

The processing unit 1204 is further configured to generate a second VXLAN packet based on a MAC address of the second VTEP device after decapsulating the first VXLAN packet to obtain the control information. The second VXLAN packet includes a second VXLAN header and a second VXLAN payload, the second VXLAN payload includes a second PPP packet, the second PPP packet includes a second PPP header and a second PPP payload, the second PPP payload includes the MAC address of the second VTEP device, the second PPP packet is a second configure-request packet, and the MAC address of the second VTEP device is carried in a configuration option of the second PPP payload.

The sending unit 1206 is configured to send the second VXLAN packet to the first VTEP device by using the first VXLAN tunnel.

After the second VTEP device implements the configuration option negotiation function defined in the PPP, further, in some embodiments, the second VTEP device is configured to implement a route synchronization function. The second VTEP device includes:

The receiving unit 1202 is further configured to receive a third VXLAN packet from the first VTEP device by using the first VXLAN tunnel after the sending unit 1206 sends the second VXLAN packet to the first VTEP device by using the first VXLAN tunnel. The third VXLAN packet includes a third VXLAN header and a third VXLAN payload, the third VXLAN payload includes a third PPP packet, the third PPP packet includes a third PPP header and a third PPP payload, the third PPP payload includes a routing protocol packet, the routing protocol packet carries a route that is from the first VTEP device to a VM connected to the first VTEP device, and the routing protocol packet is a RIP packet or an OSPF packet.

The processing unit 1204 is further configured to update a routing table of the second VTEP device based on the MAC address of the first VTEP device and the route that is from the first VTEP device to the VM connected to the first VTEP device and that is carried in the routing protocol packet.

The second VTEP device shown in FIG. 15 may perform the corresponding steps performed by the second VTEP device in the methods of the foregoing embodiments, to ensure that simple VXLAN control plane communication is implemented during use of a VXLAN control plane, and to help reduce overheads and complexity of implementing the VXLAN control plane.

Figure 16:
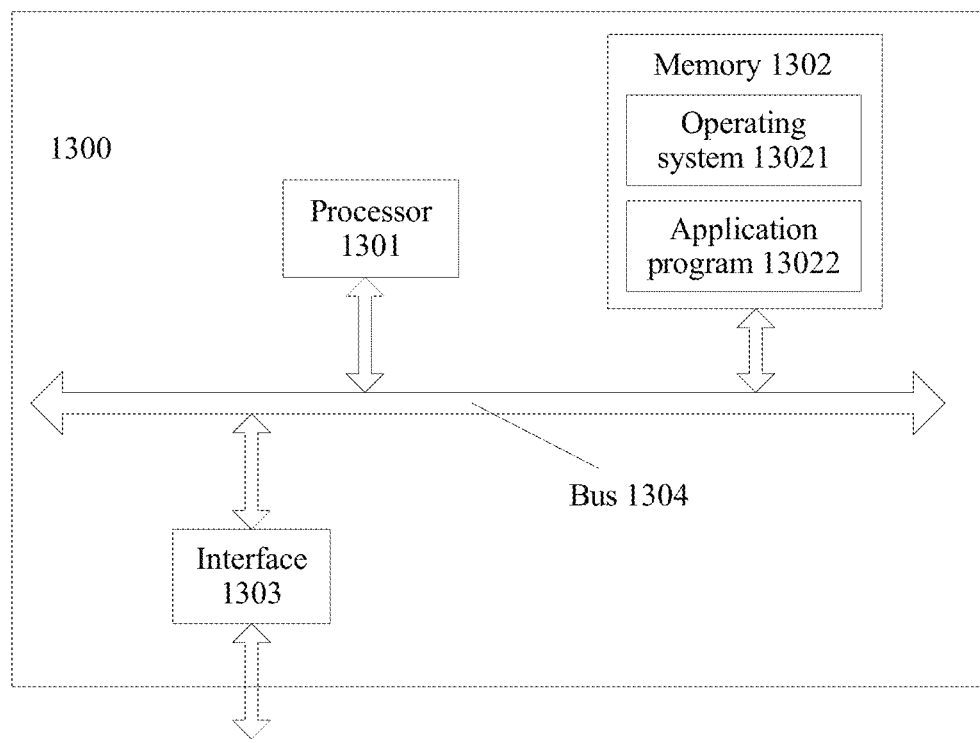
FIG. 16 is a schematic structural diagram of hardware of a second VTEP device according to an embodiment of the present application.

FIG. 16 is a schematic structural diagram of hardware of a second VTEP device 1300 according to an embodiment of the present application. The second VTEP device shown in FIG. 16 may perform corresponding steps performed by the second VTEP device in the methods of the foregoing embodiments.

As shown in FIG. 16, the second VTEP device 1300 includes a processor 1301, a memory 1302, an interface 1303, and a bus 1304. The interface 1303 may be implemented in a wireless or wired manner, and specifically, may be an element such as a network interface card. The processor 1301, the memory 1302, and the interface 1303 are connected by using the bus 1304.

The interface 1303 may specifically include a transmitter and a receiver and is configured to: transmit or receive information between the second VTEP device and the first VTEP device in the foregoing embodiments, or transmit or receive information between the second VTEP device and a VM connected to the second VTEP device. In addition, the interface 1303 may be further configured to transmit or receive information between the second VTEP device and a controller. For example, the interface 1303 is configured to support processes S104, S203, S208, S303, S401, S403, S408, and S501 in FIG. 2 to FIG. 7A and FIG. 7B. The processor 1301 is configured to perform processing performed by the second VTEP device in the foregoing embodiments. For example, the processor 1301 parses a first VXLAN packet to obtain control information. In some embodiments, the processor 1301 may be configured to: generate a VXLAN packet, send the VXLAN packet to the first VTEP device by using the interface 1303, determine whether the first VTEP device has been authenticated by the second VTEP device according to PPP, update a routing table of the second VTEP device, and/or perform another process of the technology described in this specification. For example, the processor 1301 is configured to support processes S105, S201, S202, S204, S207, S301, S302, S401, S402, and S409 in FIG. 2 to FIG. 7A and FIG. 7B. The memory 1302 includes an operating system 13021 and an application program 13022, and is configured to store a program, code, or an instruction. When the processor or a hardware device executes the program, the code, or the instruction, a processing process related to the second VTEP device in FIG. 2 to FIG. 7A and FIG. 7B may be completed.

It may be understood that FIG. 16 shows merely a simplified design of the second VTEP device. During actual application, the second VTEP device may include any quantity of interfaces, processors, memories, or the like, and all second VTEP devices that may implement the present application fall within the protection scope of the present application.

In addition, an embodiment of the present application provides a computer storage medium, configured to store a computer software instruction used by the second VTEP device, and the computer software instruction includes a program designed to perform the embodiments shown in FIG. 2 to FIG. 7A and FIG. 7B.

In the implementations of FIG. 13 to FIG. 16, in some embodiments, the first VXLAN header includes first identification information, and the first identification information is used to identify that the first VXLAN payload includes the first PPP packet.

Figure 17:
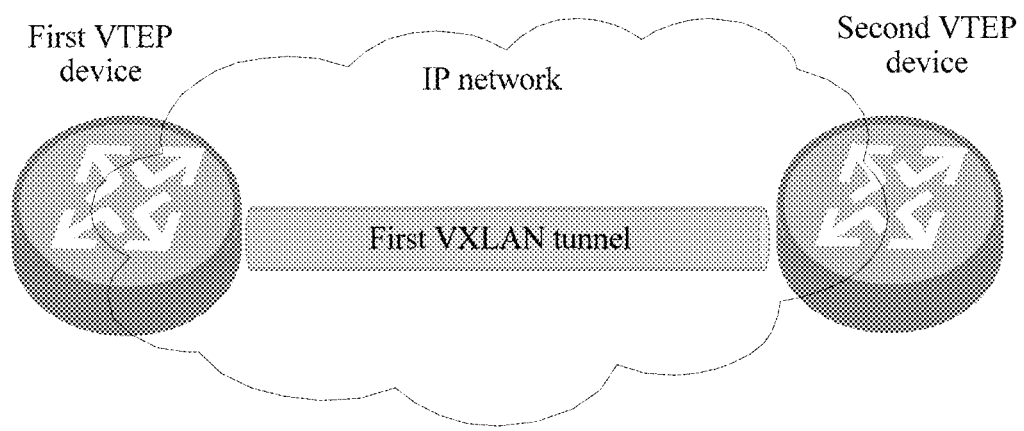
FIG. 17 is a schematic structural diagram of a packet processing system according to an embodiment of the present application.

FIG. 17 is a schematic structural diagram of a packet processing system according to an embodiment of the present application. The system includes the first VTEP device described in FIG. 13 or FIG. 14 and the second VTEP device described in FIG. 15 or FIG. 16. The first VTEP device can bidirectionally communicate with the second VTEP device by using a first VXLAN tunnel.

Method or algorithm steps described with reference to the content disclosed in the present application may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium in any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in the present application may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A packet processing method, wherein the method comprises:

obtaining, by a first virtual extensible local area network tunnel end point (VTEP) device, control information, wherein the control information is generated based on a network control task to be executed or a control function to be implemented and the control information conforms to a function defined in a Point-to-Point Protocol (PPP);

generating, by the first VTEP device, a first virtual extensible local area network (VXLAN) packet, wherein the first VXLAN packet comprises a first VXLAN header and a first VXLAN payload, the first VXLAN payload comprising a first PPP packet, the first PPP packet comprising a first PPP header and a first PPP payload, the first PPP payload comprising the control information, wherein the first VXLAN header comprises first identification information, and the first identification information is configured for identifying that the first VXLAN payload comprises the first PPP packet, the first VXLAN header further comprises an enable flag bit of the first identification information, and the enable flag bit is used to enable the first identification information; and sending, by the first VTEP device, the first VXLAN packet to a second VTEP device by using a first VXLAN tunnel.

2. The method according to claim 1, wherein the control information comprises authentication request information, the authentication request information is for implementing an authentication function defined in the PPP, and after the sending, by the first VTEP device, the first VXLAN packet to a second VTEP device by using a first VXLAN tunnel, the method further comprises:

receiving, by the first VTEP device, a second VXLAN packet from the second VTEP device by using the first VXLAN tunnel, wherein the second VXLAN packet comprises a second VXLAN header and a second VXLAN payload, the second VXLAN payload comprising a second PPP packet, the second PPP packet comprising a second PPP header and a second PPP payload, the second PPP payload comprising authentication response information of the authentication request information; and determining, by the first VTEP device based on the authentication response information in the second VXLAN packet, that the first VTEP device has been authenticated by the second VTEP device according to the PPP or fails to be authenticated by the second VTEP device according to the PPP.

3. The method according to claim 2, wherein the obtaining, by a first VTEP device, control information comprises:
receiving, by the first VTEP device, verification information from the second VTEP device, wherein the verification information is used by the first VTEP device to obtain the authentication request information based on the verification information, and the verification information comprises a packet randomly generated by the second VTEP device; and
obtaining, by the first VTEP device, the authentication request information according to the verification information, wherein the authentication request information comprises the packet randomly generated by the second VTEP device.

4. The method according to claim 1, wherein
the control information comprises a first echo packet, the first echo packet is for implementing a connectivity detection function defined in the PPP, and after the sending, by the first VTEP device, the first VXLAN packet to a second VTEP device by using a first VXLAN tunnel, the method further comprises:
receiving, by the first VTEP device, a second VXLAN packet from the second VTEP device by using the first VXLAN tunnel, wherein the second VXLAN packet comprises a second VXLAN header and a second VXLAN payload, the second VXLAN payload comprising a second PPP packet, the second PPP packet comprising a second PPP header and a second PPP payload, and the second PPP payload comprising a reply packet of the first echo packet; and
determining, by the first VTEP device based on the second VXLAN packet, that the first VXLAN tunnel is connected.

5. The method according to claim 1, wherein
the control information comprises a Media Access Control (MAC) address of the first VTEP device, the MAC address of the first VTEP device is carried in a configuration option field of the first PPP payload, the first PPP packet is a first configure-request packet, and after the sending, by the first VTEP device, the first VXLAN packet to a second VTEP device by using a first VXLAN tunnel, the method further comprises:
receiving, by the first VTEP device, a second VXLAN packet from the second VTEP device by using the first VXLAN tunnel, wherein the second VXLAN packet comprises a second VXLAN header and a second VXLAN payload, the second VXLAN payload comprising a second PPP packet, the second PPP packet comprising a second PPP header and a second PPP payload, and the second PPP packet being a second configure-request packet, the second PPP payload comprising a MAC address of the second VTEP device, the MAC address of the second VTEP device being carried in a configuration option field of the second PPP payload.

6. The method according to claim 5, wherein after the receiving, by the first VTEP device, a second VXLAN packet from the second VTEP device by using the first VXLAN tunnel, the method further comprises:
generating, by the first VTEP device, a third VXLAN packet, wherein the third VXLAN packet comprises a third VXLAN header and a third VXLAN payload, the third VXLAN payload comprising a third PPP packet, the third PPP packet comprising a third PPP header and a third PPP payload, the third PPP payload comprising a routing protocol packet, the routing protocol packet carrying a route that is from the first VTEP device to a virtual machine (VM) connected to the first VTEP device, the routing protocol packet being a Routing Information Protocol (RIP) packet or an Open Shortest Path First (OSPF) packet; and
sending, by the first VTEP device, the third VXLAN packet to the second VTEP device by using the first VXLAN tunnel.

7. The method according to claim 1, wherein
the control information comprises a first echo packet, the first echo packet is for implementing a loop detection function defined in the PPP, the first echo packet carries a first magic number, and the method further comprises:
receiving, by the first VTEP device, a second VXLAN packet from a third VTEP device by using a second VXLAN tunnel, wherein the second VXLAN packet comprises a second VXLAN header and a second VXLAN payload, the second VXLAN payload comprises a second PPP packet, the second PPP packet comprises a second PPP header and a second PPP payload, the second PPP payload comprises a second echo packet, and the second echo packet carries a second magic number; and
when a value of the first magic number is equal to a value of the second magic number, determining, by the first VTEP device, that the first VXLAN tunnel, the second VXLAN tunnel, and a third VXLAN tunnel form a loop, wherein a VXLAN tunnel between the second VTEP device and the third VTEP device is the third VXLAN tunnel.

8. A packet processing method, wherein the method comprises:
receiving, by a second virtual extensible local area network tunnel end point (VTEP) device, a first VXLAN packet from a first VTEP device by using a first virtual extensible local area network (VXLAN) tunnel, wherein the first VXLAN packet comprises a first VXLAN header and a first VXLAN payload, the first VXLAN payload comprising a first Point-to-Point Protocol (PPP) packet, the first PPP packet comprising a first PPP header and a first PPP payload, the first PPP payload comprising control information, wherein the control information is generated based on a network control task to be executed or a control function to be implemented and the control information conforms to a function defined in PPP, wherein the first VXLAN header comprises first identification information, and the first identification information is used to identify that the first VXLAN payload comprises the first PPP packet, the first VXLAN header further comprises an enable flag bit of the first identification information, and the enable flag bit is used to enable the first identification information; and decapsulating, by the second VTEP device, the first VXLAN packet to obtain the control information.

9. The method according to claim 8, wherein the control information comprises authentication request information, the authentication request information being for implementing an authentication function defined in the PPP, and after the decapsulating, by the second VTEP device, the first VXLAN packet to obtain the control information, the method further comprises:

determining, by the second VTEP device, authentication response information of the authentication request information based on the authentication request information;

generating, by the second VTEP device, a second VXLAN packet based on the authentication response information, wherein the second VXLAN packet comprises a second VXLAN header and a second VXLAN payload, the second VXLAN payload comprising a second PPP packet, the second PPP packet comprising a second PPP header and a second PPP payload, the second PPP payload comprising the authentication response information of the authentication request information;

sending, by the second VTEP device, the second VXLAN packet to the first VTEP device by using the first VXLAN tunnel; and determining, by the second VTEP device based on the authentication response information, that the first VTEP device has been authenticated by the second VTEP device according to the PPP or fails to be authenticated by the second VTEP device according to the PPP.

10. The method according to claim 9, wherein before the receiving, by a second VTEP device, a first VXLAN packet from a first VTEP device by using a first VXLAN tunnel, the method further comprises:

generating, by the second VTEP device, verification information, wherein the verification information comprises a random packet; and sending, by the second VTEP device, the verification information to the first VTEP device, wherein the verification information is used by the first VTEP device to obtain the authentication request information based on the verification information.

11. The method according to claim 9, wherein the determining, by the second VTEP device based on the authentication response information, that the first VTEP device has been authenticated by the second VTEP device according to the PPP or fails to be authenticated by the second VTEP device according to the PPP comprises:

when the second VTEP device determines, based on the authentication response information, that the first VTEP device has been authenticated by the second VTEP device according to the PPP, determining, by the second VTEP device, that a status of the first VXLAN tunnel is up; or when the second VTEP device determines, based on the authentication response information, that the first VTEP device fails to be authenticated by the second VTEP device according to the PPP, determining, by the second VTEP device, that a status of the first VXLAN tunnel is down.

12. The method according to claim 8, wherein
the control information comprises a first echo packet, the first echo packet being for implementing a connectivity detection function defined in the PPP, and after the decapsulating, by the second VTEP device, the first VXLAN packet to obtain the control information, the method further comprises:

determining, by the second VTEP device, a reply packet of the first echo packet based on the first echo packet;

generating, by the second VTEP device, a second VXLAN packet based on the reply packet, wherein the second VXLAN packet comprises a second VXLAN header and a second VXLAN payload, the second VXLAN payload comprising a second PPP packet, the second PPP packet comprising a second PPP header and a second PPP payload, and the second PPP payload comprising the reply packet of the first echo packet; and sending, by the second VTEP device, the second VXLAN packet to the first VTEP device by using the first VXLAN tunnel.

13. The method according to claim 8, wherein
the control information comprises a Media Access Control (MAC) address of the first VTEP device, the MAC address of the first VTEP device being carried in a configuration option field of the first PPP payload, the first PPP packet being a first configure-request packet, and after the decapsulating, by the second VTEP device, the first VXLAN packet to obtain the control information, the method further comprises:

generating, by the second VTEP device, a second VXLAN packet based on a MAC address of the second VTEP device, wherein the second VXLAN packet comprises a second VXLAN header and a second VXLAN payload, the second VXLAN payload comprising a second PPP packet, the second PPP packet being a second configure-request packet and the second PPP packet comprising a second PPP header and a second PPP payload, the second PPP payload comprising the MAC address of the second VTEP device, the MAC address of the second VTEP device is carried in a configuration option field of the second PPP payload; and sending, by the second VTEP device, the second VXLAN packet to the first VTEP device by using the first VXLAN tunnel.

14. The method according to claim 13, wherein after the sending, by the second VTEP device, the second VXLAN packet to the first VTEP device by using the first VXLAN tunnel, the method further comprises:

receiving, by the second VTEP device, a third VXLAN packet from the first VTEP device by using the first VXLAN tunnel, wherein the third VXLAN packet comprises a third VXLAN header and a third VXLAN payload, the third VXLAN payload comprising a third PPP packet, the third PPP packet comprising a third PPP header and a third PPP payload, the third PPP payload comprising a routing protocol packet, the routing protocol packet carrying a route that is from the first VTEP device to a virtual machine (VM) connected to the first VTEP device, the routing protocol packet being a Routing Information Protocol (RIP) packet or an Open Shortest Path First (OSPF) packet; and updating, by the second VTEP device, a routing table of the second VTEP device based on the MAC address of the first VTEP device and the route that is from the first VTEP device to the VM connected to the first VTEP device and that is carried in the routing protocol packet.

15. A first virtual extensible local area network tunnel end point (VTEP) device, wherein the first VTEP device comprises:
- a non-transitory memory storing instructions; and
- a processor coupled to the non-transitory memory; wherein the instructions, when executed by the processor, cause the first VTEP device to be configured to:
- obtain control information, wherein the control information is generated based on a network control task to be executed or a control function to be implemented and the control information conforms to a function defined in a Point-to-Point Protocol (PPP);
- generate a first virtual extensible local area network (VXLAN) packet, wherein the first VXLAN packet comprises a first VXLAN header and a first VXLAN payload, the first VXLAN payload comprising a first PPP packet, the first PPP packet comprising a first PPP header and a first PPP payload, the first PPP payload comprising the control information, wherein the first VXLAN header comprises first identification information, and the first identification information is used to identify that the first VXLAN payload comprises the first PPP packet, the first VXLAN header further comprises an enable flag bit of the first identification information, and the enable flag bit is used to enable the first identification information; and
- send the first VXLAN packet to a second VTEP device by using a first VXLAN tunnel.

16. The first VTEP device according to claim 15, wherein the control information comprises authentication request information, the authentication request information is for implementing an authentication function defined in the PPP, and the instructions, when executed by the processor, further cause the first VTEP device to be configured to:
- receive a second VXLAN packet from the second VTEP device by using the first VXLAN tunnel after the first VTEP device sends the first VXLAN packet to the second VTEP device by using the first VXLAN tunnel, wherein the second VXLAN packet comprises a second VXLAN header and a second VXLAN payload, the second VXLAN payload comprising a second PPP packet, the second PPP packet comprising a second PPP header and a second PPP payload, the second PPP payload comprising authentication response information of the authentication request information; and
- determine, based on the authentication response information in the second VXLAN packet, that the first VTEP device has been authenticated by the second VTEP device according to the PPP or fails to be authenticated by the second VTEP device according to the PPP.

17. The first VTEP device according to claim 16, wherein the instructions, when executed by the processor, further cause the first VTEP device to be configured to:
- receive verification information from the second VTEP device, wherein the verification information is used by the first VTEP device to obtain the authentication request information based on the verification information, and the verification information comprises a packet randomly generated by the second VTEP device; and
- obtain the authentication request information according to the verification information, wherein the authentication request information comprises the packet randomly generated by the second VTEP device.

18. The first VTEP device according to claim 15, wherein the control information comprises a first echo packet, the first echo packet is for implementing a connectivity detection function defined in the PPP, and the instructions, when executed by the processor, further cause the first VTEP device to be configured to:
- receive a second VXLAN packet from the second VTEP device by using the first VXLAN tunnel after the first VTEP device sends the first VXLAN packet to the second VTEP device by using the first VXLAN tunnel, wherein the second VXLAN packet comprises a second VXLAN header and a second VXLAN payload, the second VXLAN payload comprising a second PPP packet, the second PPP packet comprising a second PPP header and a second PPP payload, the second PPP payload comprising a reply packet of the first echo packet; and
- determine, based on the second VXLAN packet, that the first VXLAN tunnel is connected.

19. The first VTEP device according to claim 15, wherein the control information comprises a Media Access Control (MAC) address of the first VTEP device, the MAC address of the first VTEP device being carried in a configuration option field of the first PPP payload, the first PPP packet being a first configure-request packet, and the instructions, when executed by the processor, further cause the first VTEP device to be configured to:
- receive a second VXLAN packet from the second VTEP device by using the first VXLAN tunnel after the first VTEP device sends the first VXLAN packet to the second VTEP device by using the first VXLAN tunnel, wherein the second VXLAN packet comprises a second VXLAN header and a second VXLAN payload, the second VXLAN payload comprising a second PPP packet, the second PPP packet being a second configure-request packet and the second PPP packet comprising a second PPP header and a second PPP payload, the second PPP payload comprising a MAC address of the second VTEP device, the MAC address of the second VTEP device being carried in a configuration option field of the second PPP payload.

20. The first VTEP device according to claim 19, wherein the instructions, when executed by the processor, further cause the first VTEP device to be configured to:
- generate a third VXLAN packet after the first VTEP device receives the second VXLAN packet from the second VTEP device by using the first VXLAN tunnel, wherein the third VXLAN packet comprises a third VXLAN header and a third VXLAN payload, the third VXLAN payload comprising a third PPP packet, the third PPP packet comprising a third PPP header and a third PPP payload, the third PPP payload comprising a routing protocol packet, the routing protocol packet carrying a route that is from the first VTEP device to a virtual machine (VM) connected to the first VTEP device, the routing protocol packet being a Routing Information Protocol (RIP) packet or an Open Shortest Path First (OSPF) packet; and
- send the third VXLAN packet to the second VTEP device by using the first VXLAN tunnel.

21. The first VTEP device according to claim 15, wherein the control information comprises a first echo packet, the first echo packet is for implementing a loop detection function defined in the PPP, the first echo packet carries a first magic number, and the instructions, when executed by the processor, further cause the first VTEP device to be configured to:
- receive a second VXLAN packet from a third VTEP device by using a second VXLAN tunnel, wherein the second VXLAN packet comprises a second VXLAN header and a second VXLAN payload, the second VXLAN payload comprising a second PPP packet, the second PPP packet comprising a second PPP header and a second PPP payload, the second PPP payload comprising a second echo packet, the second echo packet carrying a second magic number; and when a value of the first magic number is equal to a value of the second magic number, determine that the first VXLAN tunnel, the second VXLAN tunnel, and a third VXLAN tunnel form a loop, wherein a VXLAN tunnel between the second VTEP device and the third VTEP device is the third VXLAN tunnel.

22. A second virtual extensible local area network tunnel end point (VTEP) device, wherein the second VTEP device comprises:
   a non-transitory memory storing instructions; and
   a processor coupled to the non-transitory memory;
      wherein the instructions, when executed by the processor, cause the second VTEP device to be configured to:
   receive a first VXLAN packet from a first VTEP device by using a first virtual extensible local area network (VXLAN) tunnel, wherein the first VXLAN packet comprises a first VXLAN header and a first VXLAN payload, the first VXLAN payload comprising a first Point-to-Point Protocol (PPP) packet, the first PPP packet comprising a first PPP header and a first PPP payload, the first PPP payload comprising control information, wherein the control information is generated based on a network control task to be executed or a control function to be implemented and the control information conforms to a function defined in PPP, wherein the first VXLAN header comprises first identification information, and the first identification information is configured for identifying that the first VXLAN payload comprises the first PPP packet, the first VXLAN header further comprises an enable flag bit of the first identification information, the enable flag bit is used to enable the first identification information; and
   decapsulate the first VXLAN packet to obtain the control information.

23. The second VTEP device according to claim 22, wherein the control information comprises authentication request information, the authentication request information being for implementing an authentication function defined in the PPP, and the instructions, when executed by the processor, further cause the second VTEP device to be configured to:
   determine authentication response information of the authentication request information based on the authentication request information after decapsulating the first VXLAN packet to obtain the control information;
   generate a second VXLAN packet based on the authentication response information, wherein the second VXLAN packet comprises a second VXLAN header and a second VXLAN payload, the second VXLAN payload comprising a second PPP packet, the second PPP packet comprising a second PPP header and a second PPP payload, and the second PPP payload comprising the authentication response information of the authentication request information;
   send the second VXLAN packet to the first VTEP device by using the first VXLAN tunnel; and
   determine, based on the authentication response information, that the first VTEP device has been authenticated by the second VTEP device according to the PPP or fails to be authenticated by the second VTEP device according to the PPP.

24. The second VTEP device according to claim 23, wherein the instructions, when executed by the processor, further cause the second VTEP device to be configured to:
   generate verification information before the second VTEP device receives the first VXLAN packet from the first VTEP device by using the first VXLAN tunnel, wherein the verification information comprises a random packet; and
   send the verification information to the first VTEP device, wherein the verification information is used by the first VTEP device to obtain the authentication request information based on the verification information.

25. The second VTEP device according to claim 23, wherein the instructions, when executed by the processor, further cause the second VTEP device to be configured to:
   when the second VTEP device determines, based on the authentication response information, that the first VTEP device has been authenticated by the second VTEP device according to the PPP, determine that a status of the first VXLAN tunnel is up; and
   when the second VTEP device determines, based on the authentication response information, that the first VTEP device fails to be authenticated by the second VTEP device according to the PPP, determine that a status of the first VXLAN tunnel is down.

26. The second VTEP device according to claim 22, wherein
   the control information comprises a first echo packet, the first echo packet is for implementing a connectivity detection function defined in the PPP, and the instructions, when executed by the processor, further cause the second VTEP device to be configured to:
   determine a reply packet of the first echo packet based on the first echo packet after decapsulating the first VXLAN packet to obtain the control information;
   generate a second VXLAN packet based on the reply packet, wherein the second VXLAN packet comprises a second VXLAN header and a second VXLAN payload, the second VXLAN payload comprises a second PPP packet, the second PPP packet comprises a second PPP header and a second PPP payload, and the second PPP payload comprises the reply packet of the first echo packet; and
   send the second VXLAN packet to the first VTEP device by using the first VXLAN tunnel.

27. The second VTEP device according to claim 22, wherein the control information comprises a Media Access Control (MAC) address of the first VTEP device, the MAC address of the first VTEP device being carried in a configuration option field of the first PPP payload, the first PPP packet being a first configure-request packet, and the instructions, when executed by the processor, further cause the second VTEP device to be configured to:
   generate a second VXLAN packet based on a MAC address of the second VTEP device after decapsulating the first VXLAN packet to obtain the control information, wherein the second VXLAN packet comprises a second VXLAN header and a second VXLAN payload, the second VXLAN payload comprising a second PPP packet, the second PPP packet being a second configure-request packet and the second PPP packet comprising a second PPP header and a second PPP payload, the second PPP payload comprising the MAC address of the second VTEP device, the MAC address of the second VTEP device being carried in a configuration option field of the second PPP payload; and send the second VXLAN packet to the first VTEP device by using the first VXLAN tunnel.

* * * * *